(12) United States Patent
Wang et al.

(10) Patent No.: US 11,848,494 B2
(45) Date of Patent: Dec. 19, 2023

(54) ELECTRONIC DEVICE

(71) Applicant: HONOR DEVICE CO., LTD., Guangdong (CN)

(72) Inventors: Rong Wang, Shenzhen (CN); Bing Liu, Shenzhen (CN); Yuchan Yang, Shenzhen (CN); Hanyang Wang, Shenzhen (CN); Huiliang Xu, Shenzhen (CN); Chien-Ming Lee, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/791,054

(22) PCT Filed: Mar. 26, 2021

(86) PCT No.: PCT/CN2021/083419
§ 371 (c)(1),
(2) Date: Jul. 6, 2022

(87) PCT Pub. No.: WO2021/208710
PCT Pub. Date: Oct. 21, 2021

(65) Prior Publication Data
US 2023/0021251 A1     Jan. 19, 2023

(30) Foreign Application Priority Data

Apr. 17, 2020    (CN) .......................... 202010306594.4

(51) Int. Cl.
*H01Q 1/52*      (2006.01)
*H01Q 1/24*      (2006.01)
(Continued)

(52) U.S. Cl.
CPC ............. *H01Q 1/526* (2013.01); *G04G 17/04* (2013.01); *G04R 60/12* (2013.01); *H01Q 1/242* (2013.01); *H01Q 1/273* (2013.01); *H04M 1/0266* (2013.01)

(58) Field of Classification Search
CPC .......... H01Q 1/52; H01Q 1/526; H01Q 1/242; H01Q 1/243; H01Q 1/273; H01Q 1/22; H01Q 1/44
See application file for complete search history.

(56) References Cited

U.S. PATENT DOCUMENTS

| 9,456,062 B2 | 9/2016 | Oh |
| 9,998,576 B2 | 6/2018 | Kim et al. |

(Continued)

FOREIGN PATENT DOCUMENTS

| CN | 103885333 A | 6/2014 | |
| CN | 204539638 U * | 8/2015 | ............. G04G 21/04 |

(Continued)

OTHER PUBLICATIONS

Office Action issued in JP2022-543750, dated May 5, 2023, 7 pages.

*Primary Examiner* — Hoang V Nguyen

(57) ABSTRACT

The present invention provides an electronic device. The electronic device includes a mainboard, a metal frame, a display module, and a shield structure. The mainboard includes a radio frequency circuit. The metal frame is coupled to the radio frequency circuit, and configured to receive or transmit a radio frequency signal. The shield structure is located in the display module or on a side of the display module closer to the mainboard, and is connected to the display module. The shield structure includes a metal shield layer. The metal shield layer is insulated from the metal frame and the radio frequency circuit, and the metal shield layer can generate reflection between the metal frame and the display module, weaken field strength generated in (Continued)

the display module by radiated energy from the metal frame, and shield the energy radiated from the metal frame to the display module.

11 Claims, 20 Drawing Sheets

(51) Int. Cl.
    *G04G 17/04*     (2006.01)
    *G04R 60/12*     (2013.01)
    *H01Q 1/27*     (2006.01)
    *H04M 1/02*     (2006.01)

(56) References Cited

U.S. PATENT DOCUMENTS

| | | |
|---|---|---|
| 10,355,344 B1 | 7/2019 | Ruaro et al. |
| 10,423,214 B2 | 9/2019 | Mistry et al. |
| 10,461,395 B2 | 10/2019 | Samardzija et al. |
| 10,601,113 B2 | 3/2020 | Bae et al. |
| 10,623,540 B2 * | 4/2020 | Zhu .......................... H01Q 1/24 |
| 10,680,312 B2 | 6/2020 | Liu et al. |
| 10,879,597 B2 | 12/2020 | Kang et al. |
| 2009/0231960 A1 | 9/2009 | Hutcheson |
| 2012/0087065 A1 * | 4/2012 | Kim ........................ H04B 15/02 |
| | | 361/679.01 |
| 2014/0085154 A1 | 3/2014 | Nagahama |
| 2014/0354494 A1 | 12/2014 | Katz |
| 2015/0311960 A1 | 10/2015 | Samardzija et al. |
| 2017/0048991 A1 | 2/2017 | Kim et al. |
| 2017/0214422 A1 | 7/2017 | Na et al. |
| 2017/0309988 A1 | 10/2017 | Samardzija et al. |
| 2019/0067803 A1 * | 2/2019 | Kang ....................... G04R 60/06 |

FOREIGN PATENT DOCUMENTS

| | | | | |
|---|---|---|---|---|
| CN | 204539638 U | | 8/2015 | |
| CN | 205656396 U | | 10/2016 | |
| CN | 207069050 U | | 3/2018 | |
| CN | 207069050 U | * | 3/2018 | ............... H01Q 1/36 |
| CN | 108702403 A | | 10/2018 | |
| CN | 208569611 U | | 3/2019 | |
| CN | 208569611 U | * | 3/2019 | ............. G06F 3/046 |
| CN | 110190883 A | | 8/2019 | |
| EP | 2869398 A1 | | 5/2015 | |
| JP | 2017531325 A | * | 10/2017 | ............... H05K 9/00 |
| JP | 2017531325 A | | 10/2017 | |
| RU | 2399085 C2 | | 9/2010 | |
| RU | 128012 U1 | | 5/2013 | |
| RU | 2621975 C2 | | 6/2017 | |
| RU | 2676211 C1 | | 12/2018 | |
| WO | 2019045472 A1 | | 3/2019 | |

* cited by examiner

10

10

(a) (b)

ELECTRONIC DEVICE

This application is a National Stage of International Application No. PCT/CN2021/083419, filed on Mar. 26, 2021, which claims priority to Chinese Patent Application No. 202010306594.4, filed on Apr. 17, 2020. The disclosures of the aforementioned application is hereby incorporated by reference in its entirety.

TECHNICAL FIELD

This application relates to the field of display technologies, and in particular, to an electronic device.

BACKGROUND

Under the development trend of miniaturization, thinness, and high screen-to-body ratio, terminal products have a tight internal structure space, such that headroom regions of antennas are increasingly compressed, making it difficult to improve antenna efficiency. Currently, in order to improve the antenna efficiency, a shield structure connected to an end of an antenna can be disposed. However, this may affect a main structure of the product and increase complexity of product design. In addition, the antenna with such structure has a limited use region or spatial freedom and more complex assembly process.

SUMMARY

Embodiments of this application provide an electronic device, to improve antenna efficiency and simplify a terminal assembly process.

To achieve the foregoing objective, the following technical solutions are used in this application.

According to a first aspect of the embodiments of this application, an electronic device is provided. The electronic device includes a mainboard, a metal frame, a display module, and a shield structure. The display module is configured to display an image. The mainboard includes a radio frequency circuit. The metal frame is coupled to the radio frequency circuit, and configured to receive or transmit a radio frequency signal. The display module is disposed in the metal frame and surrounded by the metal frame. The shield structure is located in the display module or on a side of the display module closer to the mainboard, and is connected to the display module. The shield structure includes a metal shield layer. The metal shield layer is insulated from the metal frame and the radio frequency circuit, and the metal shield layer is annular. In this case, the metal shield layer in the shield structure may generate reflection between the metal frame and the display module, thereby weakening field strength generated in the display module by radiated energy from the metal frame. In this way, the field distribution concentrated on a metal material in the display module, especially a transparent metal material, is weakened, so that currents on the transparent metal material are reduced, and the energy radiated from the metal frame to the display module is shielded, to reduce absorption of the antenna-radiated energy by a lossy material inside the display module, and improve the antenna efficiency. In addition, because the metal shield layer is annular, when the metal shield layer is disposed on the side of the display module closer to the mainboard, a communication circuit on a side of the metal shield layer farther away from the display module, such as a near field communication circuit, can transmit and receive signals through an opened portion in the ring. Moreover, when the metal shield layer is located inside the display module, for example, disposed on a light-emitting side of a display panel in the display module, the opened portion in the ring may be used to expose an active area of the display panel, thereby reducing impact on the display effect.

Optionally, the metal shield layer includes a mesh structure formed by a plurality of intersecting metal wires. A gap is present between two adjacent metal wires in the mesh structure, so that an area of a hollow part in the metal shield layer can be increased, thereby increasing transmittance of the metal shield layer.

Optionally, a wire width of the metal wire ranges from 0.1 μm to 20 μm; a distance between two adjacent metal wires ranges from 0.1 μm to 500 μm; the metal wire has a sheet resistance R; and $0<R\le 10\Omega/\square$. "$\Omega/\square$" is the unit of sheet resistance. In this case, the metal shield layer may be prepared by using a metal mesh process, so that the transmittance of the metal shield layer with the foregoing wire width and distance can reach 85%. In addition, the sheet resistance of the metal wire is within $10\Omega/\square$, allowing a good electrical conductivity for the metal shield layer, and enhancing reflection of the radiated energy from the metal frame by the metal shield layer, so as to improve the shielding effect.

Optionally, a width H of an annular portion of the metal shield layer is in the range of 0 mm<H≤2 mm. When H of the metal shield layer is greater than 2 mm, benefit of the shielding effect of the metal shield layer tends to be steady. Therefore, to save materials, a width H of an unopened portion of the metal shield layer 120 may be in the range of 0 mm<H≤2 mm.

Optionally, the metal frame, the metal shield layer, and the display module are all in a circular ring shape. Centers of the metal frame, the metal shield layer, and the display module coincide. Alternatively, the metal frame, the metal shield layer, and the display module are all in a rectangular ring shape. Geometric centers of the metal frame, the metal shield layer, and the display module coincide. The geometric center is an intersection of two diagonals of the rectangular ring. This facilitates the assembling of the metal frame, the metal shield layer, and the display module.

Optionally, the electronic device includes a near field communication circuit. The near field communication circuit and the shield structure are both disposed on a side of the display module closer to the mainboard. The shield structure is located between the near field communication circuit and the display module. The near field communication circuit is configured to transmit or receive a near field communication signal on a side of the display module through the opened portion of the metal shield layer. In this way, the shield structure can be used to shield the metal material in the display module from absorbing the antenna energy, and near field communication signals can still be transmitted and received through the opened portion of the shield structure.

Optionally, the electronic device includes a near field communication circuit. The near field communication circuit and the shield structure are both disposed on a side of the display module closer to the mainboard. The near field communication circuit is located between the shield structure and the display module. The near field communication circuit is configured to transmit or receive a near field communication signal on a side of the display module. Disposing the shield structure below the near field communication circuit can prevent the shield structure from affecting communication signal reception and transmission by the near field communication circuit on a side of the display panel. In this case, the metal shield layer can cover the entire back of the display panel, such that coverage of the metal shield layer is large enough to improve the shielding effect.

Optionally, the display module includes a display panel. The shield structure is disposed on a light-emitting side of the display panel. An opened portion of the metal shield layer is used to expose an active area of the display panel. In this case, when the display panel is a liquid crystal display and a common electrode in the display panel is located on a cell substrate, the shield structure disposed on the light-emitting side of the display panel is closer to the common electrode. Moreover, when the display panel is an organic light-emitting diode display, a first electrode (for example, a cathode) of the organic light-emitting diode display panel on a side farther away from the mainboard is closer to the shield structure. Because both the common electrode and the first electrode can be made of a transparent metal material, the shield structure can be disposed closer to the transparent metal material, to effectively reduce the absorption of radiated energy from the metal frame by the transparent metal material, thereby improving the antenna efficiency.

Optionally, the shield structure further includes a first transparent carrier plate. The metal shield layer is disposed on a side surface of the first transparent carrier plate closer to the display module. The first transparent carrier plate is connected to the display module, and a thickness of the first transparent carrier plate ranges from 23 μm to 150 μm. When the thickness of the first transparent carrier plate is less than 23 μm, the manufacturing process is required to be highly accurate, which is not conducive to reducing production costs. Moreover, when the thickness of the first transparent carrier plate is greater than 150 μm, an overall thickness of the electronic device is increased, which does not meet the design requirements of making products smaller, thinner, and lighter.

Optionally, the display module further includes a touchscreen disposed on the light-emitting side of the display panel. The touchscreen includes a second transparent carrier plate and a plurality of insulating and transparent touch electrodes. The touch electrodes are located on a side surface of the second transparent carrier plate farther away from the display panel. The metal shield layer is disposed between the touchscreen and the display panel. The second transparent carrier plate is connected to the display panel. In this case, the display module is an out-of-cell touch display module. The metal shield layer in the shield structure is close to the touch electrodes made of a transparent metal material, and can effectively reduce absorption of the radiated energy from the metal frame by the transparent metal material, thereby improving the antenna efficiency.

Optionally, the display module further includes a plurality of insulating and transparent touch electrodes. The touch electrodes are disposed on a side surface of the display panel farther away from the mainboard. The shield structure further includes a first transparent carrier plate. The metal shield layer is disposed on a side surface of the first transparent carrier plate farther away from the display panel. The first transparent carrier plate is connected to the display panel. In this case, the display module is an out-of-cell touch display module. The metal shield layer in the shield structure is close to the touch electrodes made of a transparent metal material, and can effectively reduce absorption of the radiated energy from the metal frame by the transparent metal material, thereby improving the antenna efficiency.

Optionally, the display panel includes a plurality of insulating and transparent touch electrodes. The shield structure further includes a first transparent carrier plate. The metal shield layer is disposed on a side surface of the first transparent carrier plate closer to the display panel. The first transparent carrier plate is connected to the display panel. In this case, the display module is an embedded touch display module. The metal shield layer in the shield structure is close to the touch electrodes made of a transparent metal material, and can effectively reduce absorption of the radiated energy from the metal frame by the transparent metal material, thereby improving the antenna efficiency.

Optionally, a material of the metal shield layer includes at least one of silver or copper. This allows the material of the metal shield layer to have a good electrical conductivity, and enhances an effect of reflection of the radiated energy from the metal frame by the metal shield layer, thereby improving the shielding effect.

Optionally, the metal shield layer is coupled to a grounding terminal on the mainboard. This also achieves the shielding effect.

Optionally, the shield structure is configured to shield energy radiated from the metal frame to the display module, to weaken field strength generated in the display module by the energy radiated from the metal frame. In this way, the field distribution concentrated on a metal material in the display module, especially a transparent metal material, is weakened, so that currents on the transparent metal material are reduced, and the energy radiated from the metal frame to the display module is shielded, to reduce absorption of the antenna-radiated energy by a lossy material inside the display module, and improve the antenna efficiency.

Optionally, the shield structure is disposed in the metal frame and surrounded by the metal frame. In this way, the shield structure can be attached to the display module, so that the metal frame can wrap both the display module and the shield structure.

According to a second aspect of the embodiments of this application, an electronic device is provided. The electronic device includes a display module, a mainboard, a metal frame, and a shield structure. The display module is configured to display an image. The mainboard includes a radio frequency circuit. The metal frame is disposed around the display module, coupled to the radio frequency circuit, and configured to receive or transmit a radio frequency signal. The shield structure is located in the display module or on a side of the display module closer to the mainboard, and is connected to the display module. The shield structure includes a metal shield layer. The metal shield layer is insulated from the metal frame and the radio frequency circuit. The metal shield layer includes a mesh structure formed by a plurality of intersecting metal wires. The shielding effect of the metal shield layer is the same as that described above, and is not repeated herein. In addition, in a case that the metal shield layer is configured as a metal mesh, when the metal shield layer is disposed on the side of the display module closer to the mainboard, a communication circuit on a side of the metal shield layer farther away from the display module, such as a near field communication circuit, can transmit and receive signals through a gap (or opening) of the mesh structure. Moreover, when the metal shield layer is located inside the display module, for example, disposed on a light-emitting side of a display panel in the display module, the gap (or opening) in the mesh structure may be used to expose an active area of the display panel, thereby reducing impact on the display effect.

Optionally, a wire width of the metal wire ranges from 0.1 μm to 20 μm; a distance between two adjacent metal wires ranges from 0.1 μm to 500 μm; the metal wire has a sheet resistance R; and 0<R≤10Ω/□. In this case, transmittance of the metal shield layer reaches 85%.

Optionally, the electronic device includes a near field communication circuit. The near field communication circuit and the shield structure are both disposed on a side of the display module closer to the mainboard. The shield structure is located between the near field communication circuit and the display module. The near field communication circuit is configured to transmit or receive a near field communication signal on a side of the display module through an opened portion of the mesh structure. The technical effect of disposing the shield structure between the near field communication circuit and the display module is the same as that described above, and is not repeated herein.

Optionally, the electronic device includes a near field communication circuit; and the near field communication circuit and the shield structure are both disposed on a side of the display module closer to the mainboard. The near field communication circuit is located between the shield structure and the display module; and the near field communication circuit is configured to transmit or receive a near field communication signal on a side of the display module. The technical effect of disposing the near field communication circuit between the shield structure and the display module is the same as that described above, and is not repeated herein.

Optionally, the display module includes a display panel. The shield structure is disposed on a light-emitting side of the display panel. The technical effect of disposing the shield structure on the light-emitting side of the display panel is the same as that described above, and is not repeated herein.

According to a third aspect of the embodiments of this application, an electronic device is provided. The electronic device includes a display module, a mainboard, a metal frame, and a shield structure. The display module is configured to display an image. The mainboard includes a radio frequency circuit. The metal frame surrounding the display module is coupled to the radio frequency circuit, and configured to receive or transmit a radio frequency signal. The shield structure is located on a side of the display module closer to the mainboard, and is connected to the display module. The shield structure includes a metal shield layer. The metal shield layer is insulated from the metal frame and the radio frequency circuit. The metal shield layer covers the side of the display module closer to the mainboard. The shielding effect of the metal shield layer is the same as that described above, and is not repeated herein. In addition, the metal shield layer covers the side of the display module closer to the mainboard, allowing the metal shield layer to cover the entire back of the display panel, so that coverage of the metal shield layer is large enough to improve the shielding effect.

Optionally, the electronic device includes a near field communication circuit. The near field communication circuit and the shield structure are both disposed on a side of the display module closer to the mainboard. The near field communication circuit is located between the shield structure and the display module. The near field communication circuit is configured to transmit or receive a near field communication signal on a side of the display module. The technical effect of disposing the near field communication circuit between the shield structure and the display module is the same as that described above, and is not repeated herein.

Figure 1A:
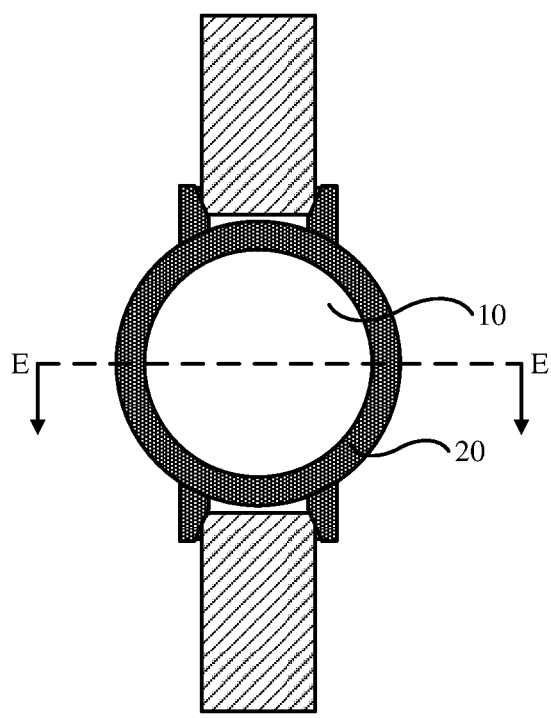
FIG. 1a a schematic structural diagram of an electronic device according to an embodiment of this application.

Reference signs are described as follows:

01: electronic device; 10: display module; 20: metal frame; 11: conducting part; 12: shield structure; 30: mainboard; 101: display panel; 102: BLU; 200: array substrate; 201: cell substrate; 202: liquid crystal layer; 212: liquid crystal molecules; 31: pixel electrode; 32: common electrode; 41: first substrate; 100: sub-pixel; 33: OLED device; 331: first electrode; 332: second electrode; 333: light-emitting function layer; 34: packaging cover plate; 120: metal shield layer; 121: first transparent carrier plate; 122: metal wire; 50: hollow structure; 103: NFC; 105: cover plate; 104: touch-screen; 114: second transparent carrier plate; and 124: touch electrode.

DESCRIPTION OF EMBODIMENTS

The following describes the technical solutions in the embodiments of this application with reference to the accompanying drawings in the embodiments of this application. Apparently, the described embodiments are merely some but not all of the embodiments of this application.

In addition, the terms such as "first" and "second" are merely intended for a purpose of description, and shall not be understood as an indication or implication of relative importance or an implicit indication of the number of the indicated technical features. Therefore, a feature limited by "first", "second", or the like may explicitly or implicitly include one or more features. In the descriptions of this application, unless otherwise stated, "a plurality of" means at least two.

In addition, in this application, the orientation terms such as "upper", "lower", "left", and "right" may be defined with respect to the schematic orientation of the accompanying drawings, but are not limited thereto. It should be understood that these directional terms may be relative concepts, are used in relative description and clarification, and may correspondingly change according to the change of the placed orientation of the components in the accompanying drawings.

In the descriptions of this application, unless otherwise specified and defined explicitly, the term "connection" should be understood in its general senses. For example, the "connection" may be a fixed connection, a detachable connection, or an integrated connection; or may be a direct connection, or an indirect connection through an intermediate medium. In addition, the term "coupling" may be an electrical connection manner for implementing signal transmission. "Coupling" may be a direct electrical connection, or an indirect electrical connection through an intermediate medium.

An embodiment of this application provides an electronic device. The electronic device may include electronic products capable of hand-held calls and display, such as a mobile phone, a tablet computer, and a smartwatch. The embodiments of this application impose no special limitation on specific forms of the foregoing electronic device. For ease of description, the description is based on an example that the electronic device 01 is a smartwatch shown in FIG. 1a or a mobile phone shown in FIG. 1B.

Figure 1B:
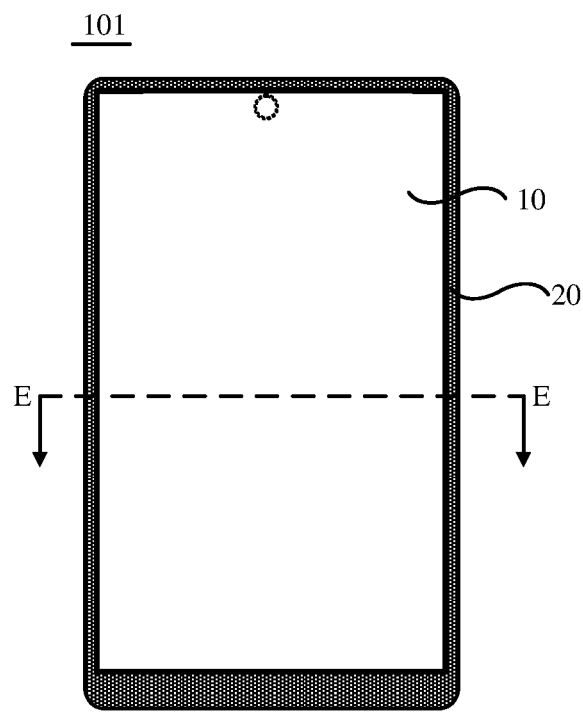
FIG. 1B is a schematic structural diagram of another electronic device according to an embodiment of this application.

As shown in FIG. 1a or FIG. 1B, the electronic device 01 may include a display module 10 and a metal frame 20. The display module 10 is configured to display an image. The metal frame 20 is disposed around the display module 10, so that the display module 10 can be disposed in the metal frame 20. In addition, the electronic device 01 further includes a mainboard 30 shown in FIG. 1c (a cross-sectional view of FIG. 1a or FIG. 1B along a line E-E). The mainboard 30 may be a rigid printed circuit board (printed circuit board, PCB) or a flexible printed circuit board (flexible printed circuit board, FPCB). A radio frequency (radio frequency, RF) circuit is disposed on the mainboard 30.

Figure 1C:
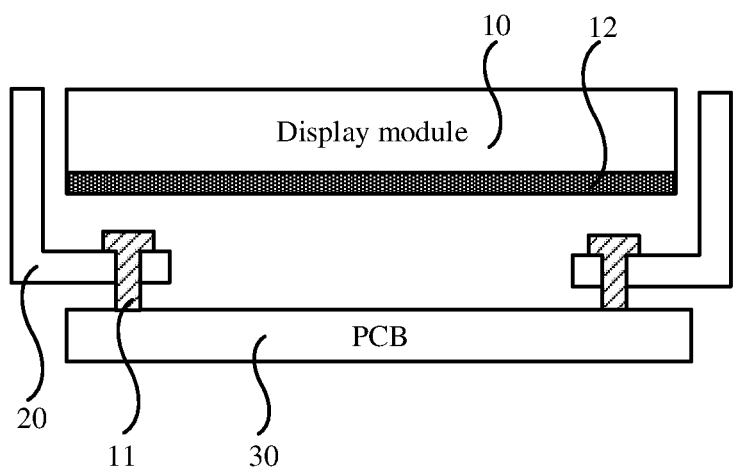
FIG. 1c is a cross-sectional view of FIG. 1a or FIG. 1B along a line E-E.

The metal frame 20 may be coupled to the RF circuit on the mainboard 30 by using a conducting part 11 shown in FIG. 1c, such as a screw or a spring plate, so that the metal frame 20 is directly fed through the screw or the spring plate, enabling the metal frame 20 to receive or transmit a radio frequency signal as an antenna. Alternatively, a capacitor may be formed between the metal frame 20 and the conducting part 11, so that the metal frame 20 can be indirectly coupled and fed through the capacitor. This application does not limit how the metal frame 20 is fed.

In addition, a position at which the conducting part 11 is electrically connected to the RF circuit on the mainboard 30 may be referred to as a feed-in point of the printed circuit board. After the metal frame 20 is fed through the conducting part 11, an operating frequency of the metal frame 20 as an antenna may vary with feed-in points or grounding point positions of the printed circuit board coupled to the conducting part 11.

For example, the metal frame 20 may serve as a Bluetooth antenna with an operating frequency of 2.4 GHz, a wireless fidelity (wireless-fidelity, Wi-Fi) antenna with an operating frequency of 2.4 GHz or 5 GHz, a global positioning system (global positioning system, GPS) antenna with an operating frequency of 1228 MHz, or a communications antenna, such as a fourth-generation (4G) signal. In this way, the metal frame 20 as an antenna can cover low-frequency (for example, from about 700 MHz to 960 MHz), and medium- and high-frequency (for example, from 1710 MHz to 2690 MHz) bands. In addition, the metal frame 20 may also serve as a fifth-generation (5G) communications antenna with an operating frequency of 450 MHz to 6 GHz, or 24 GHz to 52 GHz. This application does not limit the operating frequency of each part of the metal frame 20 as an antenna.

Figure 2A:
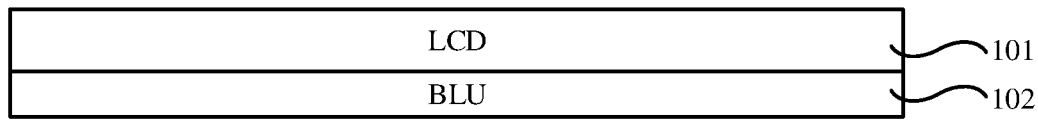
FIG. 2a is a schematic structural diagram of the display module in FIG. 1c.

The display module 10 in the metal frame 20 may include a display panel (display panel, DP). In some embodiments of this application, as shown in FIG. 2a, the display panel 101 may be a liquid crystal display (liquid crystal display, LCD). In this case, as shown in FIG. 2a, the display module 10 further includes a back light unit (back light unit, BLU) 102 for providing a light source to the LCD. The LCD may be a rigid display panel.

Figure 2B:
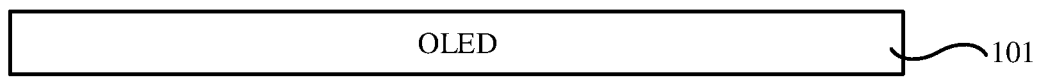
FIG. 2b is an another schematic structural diagram of the display module in FIG. 1c.

Alternatively, in some other embodiments of this application, as shown in FIG. 2b, the display panel 101 may be an organic light emitting diode (organic light emitting diode, OLED) display. The OLED display panel can emit light by itself, such that the BLU 102 does not need to be disposed in the display module 10. The OLED display panel may be a rigid display panel, or when a substrate of the OLED display panel is a flexible substrate, the OLED display panel may be a flexible display panel.

On this basis, to improve the antenna efficiency of the metal frame 20, the electronic device 01 provided in this embodiment of this application further includes a shield structure 12 shown in FIG. 1c. The shield structure 12 may be disposed in the metal frame 20, insulated from the metal frame 20, and connected to the display module 10. The shield structure 12 is configured to shield energy radiated from the metal frame 20 to the display module 10.

Figure 3:
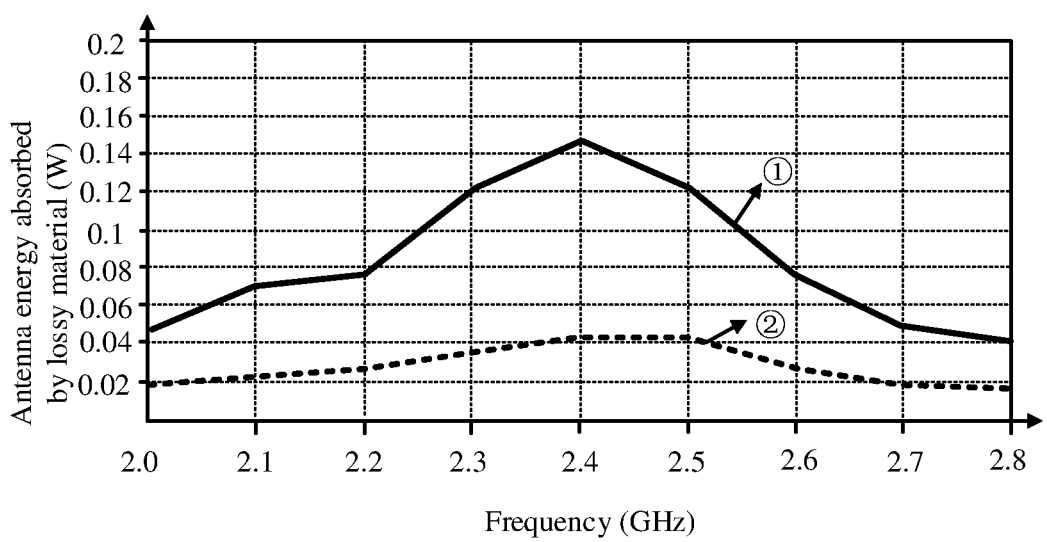
FIG. 3 is a line graph of antenna frequency and antenna energy absorbed by a lossy material according to an embodiment of this application.

In the display module 10, particularly the display panel 101 of the display module 10, some metal materials may absorb the energy radiated by the metal frame 20, reducing the antenna efficiency of the metal frame 20. Such metal materials may be referred to as lossy materials. As shown in FIG. 3 (a line graph of antenna energy absorbed by a lossy material and operating frequency of the antenna), in a frequency range of 2 GHz to 2.8 GHz, metal materials (curve ①) in the display module 10 can absorb antenna-radiated energy of up to about 0.15 watts (W). However, a transparent metal material (curve ②), such as indium tin oxide (indium tin oxide, ITO), in the foregoing metal materials can absorb the antenna-radiated energy of up to about 0.04 watts (W). Therefore, the radiated energy of the metal frame 20 (that is, the antenna) absorbed by the transparent metal material accounts for a large proportion of all the antenna-radiated energy absorbed by the metal materials.

In this case, the shield structure 12 is disposed in the metal frame 20, and the shield structure 12 can generate reflection between the metal frame 20 and the display module 10, to weaken field strength generated in the display module 10 by the radiated energy from the metal frame 20. In this way, the field distribution concentrated on the transparent metal material is weakened, currents on the transparent metal material are reduced, and the energy radiated from the metal frame 20 to the display module 10 is shielded, to reduce absorption of the radiated energy from the metal frame 20 by a lossy material such as ITO inside the display module 10, and improve the antenna efficiency.

The following illustrate the arrangement of the transparent metal material in the display module 10 by examples.

Figure 4A:
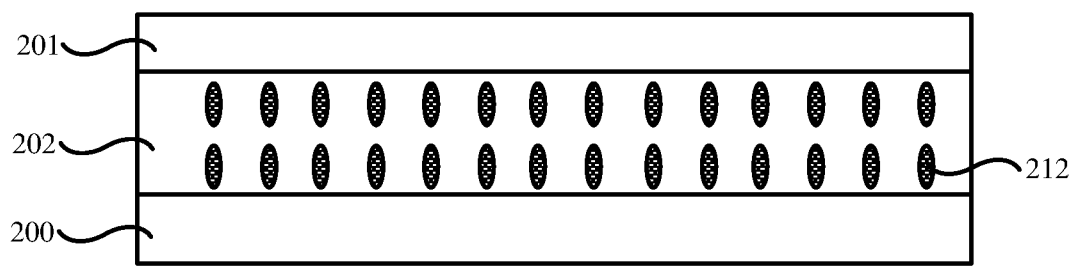
FIG. 4a is a schematic structural diagram of a display panel according to an embodiment of this application.

For example, in some embodiments of this application, when the display module 10 includes the LCD display panel 101 and the BLU 102, the LCD display panel 101 may include an array substrate 200 shown in FIG. 4a and a cell substrate 201 disposed opposite the array substrate 200. A cavity between the array substrate 200 and the cell substrate 201 forms a liquid crystal cell (cell). In addition, the LCD display panel 101 further includes a liquid crystal layer 202 filled between the array substrate 200 and the cell substrate 201. To implement color display, the cell substrate 201 may include a color filter layer (not shown in the figure). In this case, the cell substrate 201 having the color filter layer may be referred to as a color filter substrate. The color filter layer can filter out, according to different positions of sub-pixels (sub pixel) in the display panel 101, different colors of the white light emitted by the BLU 102, such as red light, green light, or blue light.

Figure 4B:
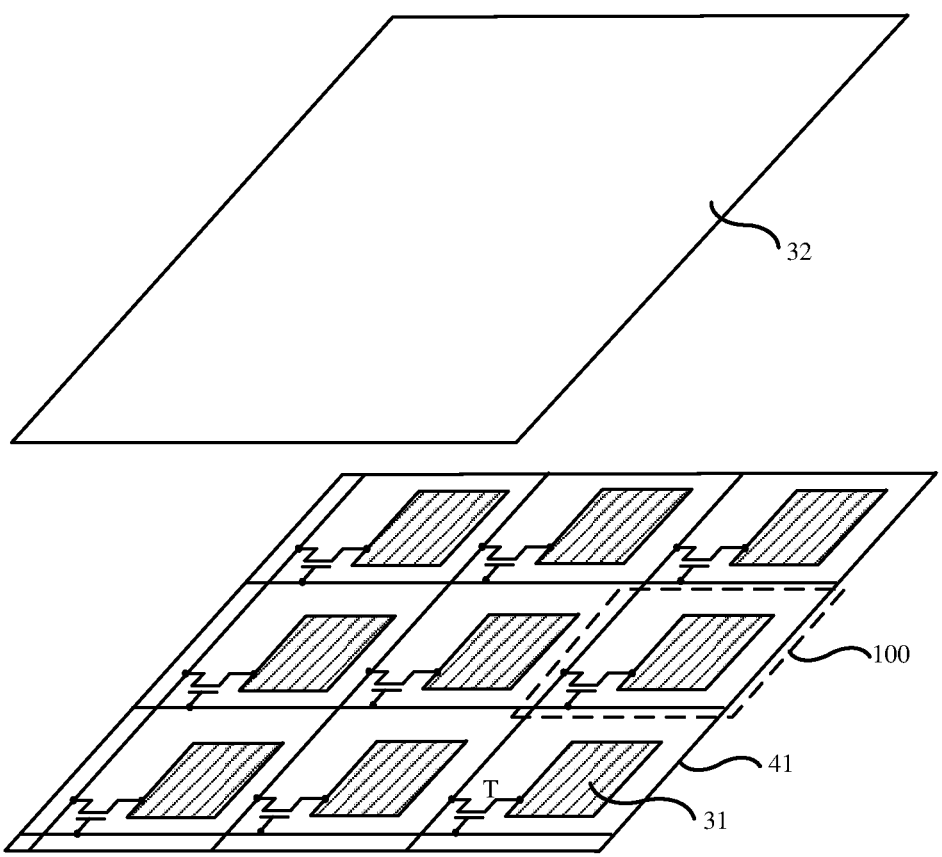
FIG. 4b is a schematic diagram of an internal structure of a display panel according to an embodiment of this application.

To control deflection directions of liquid crystal molecules 212 in the liquid crystal layer 202 in regions in which different sub-pixels are located, so as to control a display gray scale of the sub-pixels, the array substrate 200 may include a first substrate 41 shown in FIG. 4b and a plurality of pixel circuits (not shown in the figure) on the first substrate 41. Each pixel circuit is located within one sub-pixel 100. The pixel circuit 40 may include a transistor T and a liquid crystal capacitor coupled to the transistor T.

The liquid crystal capacitor C1 may include pixel electrodes (pixel electrode) 31 located in all sub-pixels 100 and a common electrode (common electrode) 32 covering the entire first substrate 41, as shown in FIG. 4b. The pixel electrodes 31 and the common electrode 32 may be made of a transparent metal material, such as ITO.

It should be noted that, the common electrode 32 and the pixel electrodes 31 may all be disposed on the first substrate 41 of the array substrate 200. Alternatively, the pixel electrodes 31 are disposed on the first substrate 41 of the array substrate 200, and the common electrode 32 is located in the cell substrate 201. This application does not limit the arrangement positions of the pixel electrodes 31 and the common electrode 32.

Figure 5:
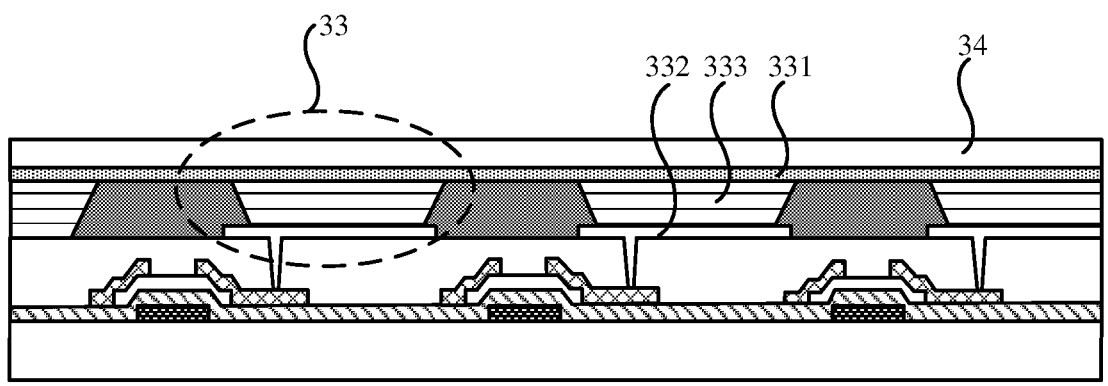
FIG. 5 is a schematic structural diagram of another display panel according to an embodiment of this application.

Alternatively, for example, in some other embodiments of this application, the display module 10 includes the OLED display panel 101. As shown in FIG. 5, the OLED display panel 101 is provided with a plurality of OLED devices 33. The OLED devices 33 include a first electrode 331 (for example, a cathode), a second electrode 332 (for example, an anode), and a light-emitting function layer 333 between the first electrode 331 and the second electrode 332. When voltage is applied to the first electrode 331 and the second electrode 332, the electric field formed between the first electrode 331 and the second electrode 332 can excite a light-emitting layer in the light-emitting function layer 333 to emit light.

For example, when the OLED device 33 is a top light-emitting device, the first electrode 331 may be made of a transparent metal material, such as ITO, so that the OLED device 33 can emit light in an upward direction (leaving the mainboard 30). In some embodiments of this application, the first electrodes 331 of all OLED devices in the OLED display panel may be connected to form an integrally formed cathode layer.

Alternatively, for another example, in some other embodiments of this application, when the display module 10 has a touch function, the display module 10 may further include a plurality of insulating and transparent touch electrodes. The touch electrodes 124 may be made of the foregoing transparent metal material, such as ITO.

It should be noted that this application does not limit a type of the display module 10 having the touch function. For example, the touch electrodes can be fabricated on a light-emitting side of the display panel 101 by using an on-cell (on cell) technology. Alternatively, the touch electrodes can be integrated inside the display panel 101 by using an in-cell (in cell) technology. In addition, the touch electrodes may implement touch in a self-capacitance touch manner or a mutual capacitance touch manner.

Figure 6:
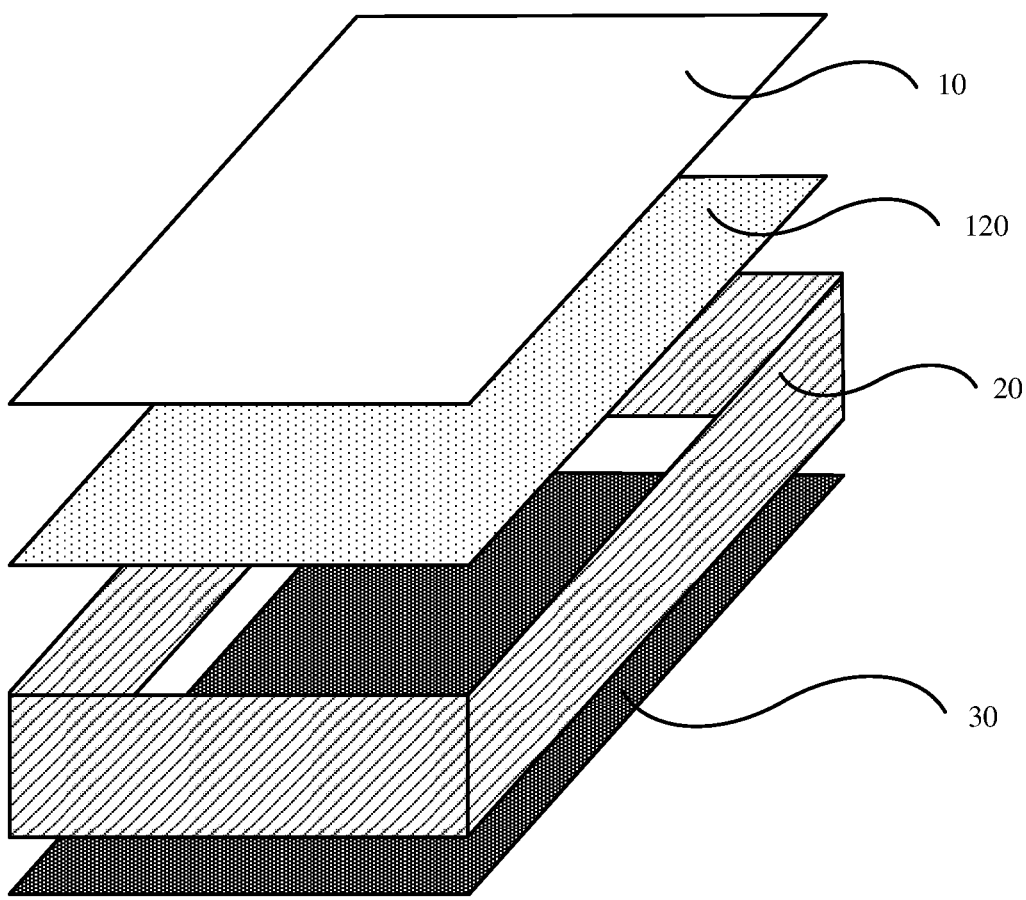
FIG. 6 is a schematic diagram of an arrangement of a shield structure according to an embodiment of this application.

On this basis, to reduce absorption of the radiated energy from the metal frame 20 to the display module 10 by the transparent metal material in the display module 10, the shield structure 12 may include a metal shield layer 120 shown in FIG. 6. The metal shield layer 120 is insulated from the metal frame 20 and the radio frequency circuit. The metal shield layer 120 may be disposed below the display module 10 (that is, on a side closer to the mainboard 30), as shown in FIG. 6; or may be disposed in the display module 10.

In addition, to enhance reflection of the radiated energy from the metal frame 20 by the metal shield layer 120, so as to improve the shielding effect, the metal shield layer 120 may be made of a metal material with good electrical conductivity, for example, at least one of silver or copper.

Based on the foregoing structure of the display module 10, the following illustrates the structure and arrangement of the shield structure 12 by examples.

Example 1

In this example, the shield structure 12 is disposed below the display module 10 (that is, on a side closer to the mainboard 30).

Figure 7A:
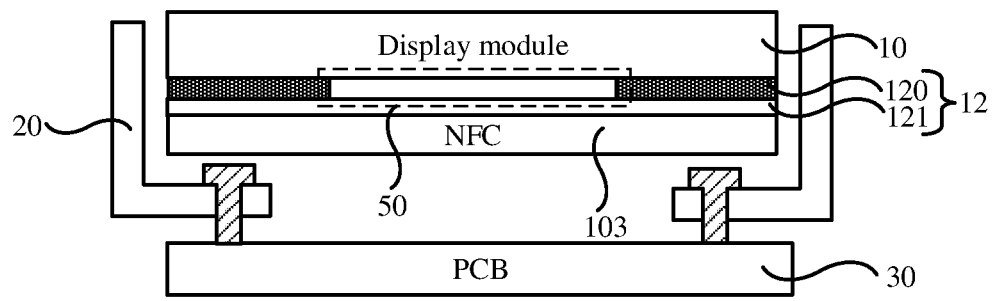
FIG. 7a is a schematic structural diagram of a cross-section of an electronic device according to an embodiment of this application.

In this case, the metal shield layer 120 may be directly attached to the back of the display module 10 (that is, on a side surface closer to the mainboard 30). Alternatively, as shown in FIG. 7a, the shield structure 12 may further include a first transparent carrier plate 121 for carrying the metal shield layer 120. The metal shield layer 120 is disposed closer to the display module 10. The first transparent carrier plate 121 may be attached to the back of the display module 10 by press-fitting, so that the metal shield layer 120 can be suspended in the metal frame 20. In this case, because the display module 10 is surrounded by the metal frame 20, the shield structure 12 attached below the display module 10 may also be disposed in the metal frame 20 and surrounded by the metal frame.

This allows the metal shield layer 120 to be installed in the electronic device 01 more easily. In addition, a plane on which the metal shield layer 120 is located is parallel or approximately parallel to a display surface of the display module 10 and a plane on which the mainboard 30 is located, so that the metal shield layer 120 does not affect a main structure of the electronic device 01 much, thereby reducing product design and assembly complexity.

In addition, the first transparent carrier plate 121 may be made of a resin material, for example, polyethylene terephthalate (Polyethylene terephthalate, PET). This application does not limit a thickness of the first transparent carrier plate 121. For example, the thickness of the first transparent carrier plate 121 may range from 23 μm to 150 μm. When the thickness of the first transparent carrier plate 121 is less than 23 μm, the manufacturing process is required to be highly accurate, which is not conducive to reducing production costs. Moreover, when the thickness of the first transparent carrier plate 121 is greater than 150 μm, an overall thickness of the electronic device 01 is increased, which does not meet the design requirements of making products smaller, thinner, and lighter. In some embodiments of this application, the thickness of the first transparent carrier plate 121 may be 23 μm, 30 μm, 40 μm, 45 μm, 50 μm, 55 μm, 60 μm, 100 μm, or 150 μm.

It should be noted that, when the display module 10 includes the LCD display panel 101 and the BLU 102, the back of the display module 10 refers to a side surface of the BLU 102 closer to the mainboard 30. Alternatively, when the display module 10 includes the OLED display panel 101, the back of the display module 10 refers to a side surface of the OLED display panel 101 closer to the mainboard 30.

In addition, the electronic device 01 may further include a near field communication circuit (near field communication, NFC) 103, as shown in FIG. 7a. The NFC 103 is disposed on the side of the display module 10 closer to the mainboard 30. The shield structure 12 is located between the NFC 103 and the display module 10.

On this basis, to enable the NFC 103 to transmit or receive a near field communication signal on a side of the display module, as shown in FIG. 7a, at least one hollow structure 50 is disposed on the metal shield layer 120 (one hollow structure 50 is used as an example in FIG. 7a). In this way, the NFC 103 can transmit a near field communication signal through the hollow structure 50 on the metal shield layer 120, or an external near field communication signal can pass through the hollow structure 50 on the metal shield layer 120 and is received by the NFC 103.

The following illustrates the arrangement of the hollow structure 50 by examples.

Figure 7B:
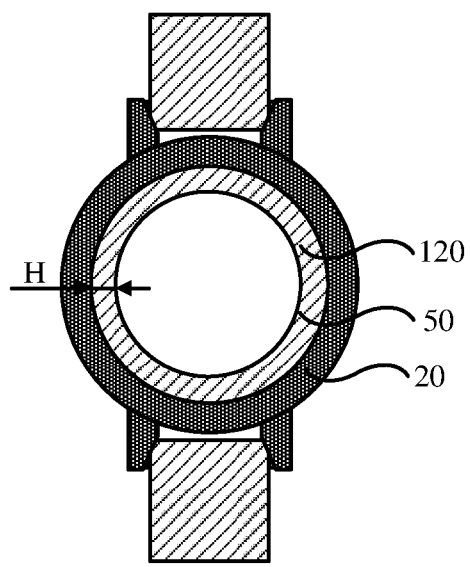
FIG. 7b is a schematic structural diagram of another electronic device according to an embodiment of this application.

In some embodiments of this application, as shown in FIG. 7b, the metal shield layer 120 has a hollow structure 50. The hollow structure 50 may be an opening provided on the metal shield layer 120. In this case, the metal shield layer 120 may be annular. In some embodiments of this application, to make a shape of the metal shield layer 120 match a shape of the entire electronic device 01, an edge contour and an opening (that is, the hollow structure 50) shape of the metal shield layer 120 may match an edge contour of the metal frame 20.

For example, when the electronic device 01 is a watch shown in FIG. 7b, an edge contour of the metal frame 20 of the watch is circular, so an edge contour and an opening (that is, the hollow structure 50) shape of the metal shield layer 120 are also circular, and the edge contour and opening (that is, the hollow structure 50) shape of the metal shield layer 120 and the edge contour of the metal frame 20 are concentric circles. In this case, the metal frame 20, the metal shield layer 120, and the display module 10 are in a circular ring shape, and centers of the metal frame 20, the metal shield layer 120, and the display module 10 coincide. This facilitates the assembling of the metal frame 20, the metal shield layer 120, and the display module 10. Alternatively, for another example, when the electronic device 01 is a mobile phone shown in FIG. 7c, an edge contour of the metal frame 20 of the mobile phone is rectangular, so an edge contour and an opening (that is, the hollow structure 50) shape of the metal shield layer 120 are also rectangular. In this case, the metal frame 20, the metal shield layer 120, and the display module 10 are in a rectangular ring shape, and geometric centers of the metal frame 20, the metal shield layer 120, and the display module 10 coincide. The geometric center is an intersection of two diagonals of the rectangular ring. This facilitates the assembling of the metal frame 20, the metal shield layer 120, and the display module 10.

Alternatively, in some electronic devices 01, some of the metal frame 20, the metal shield layer 120, and the display module 10 may be in a circular ring shape, and the others may be in a rectangular ring shape. In this case, geometric centers of the metal frame 20, the metal shield layer 120, and the display module 10 coincide. The geometric center is the center of the circular ring, or an intersection of two diagonals of the rectangular ring. For example, when the metal frame 20 is in a rectangular ring shape, and the metal shield layer 120 and the display module 10 are in a circular ring shape, an intersection of two diagonals of the metal frame 20 may coincide with centers of the metal shield layer 120 and the display module 10.

Certainly, in some other embodiments of this application, an edge contour and an opening (that is, the hollow structure 50) shape of the metal shield layer 120 may be different from an edge contour of the metal frame 20.

Figure 7C:
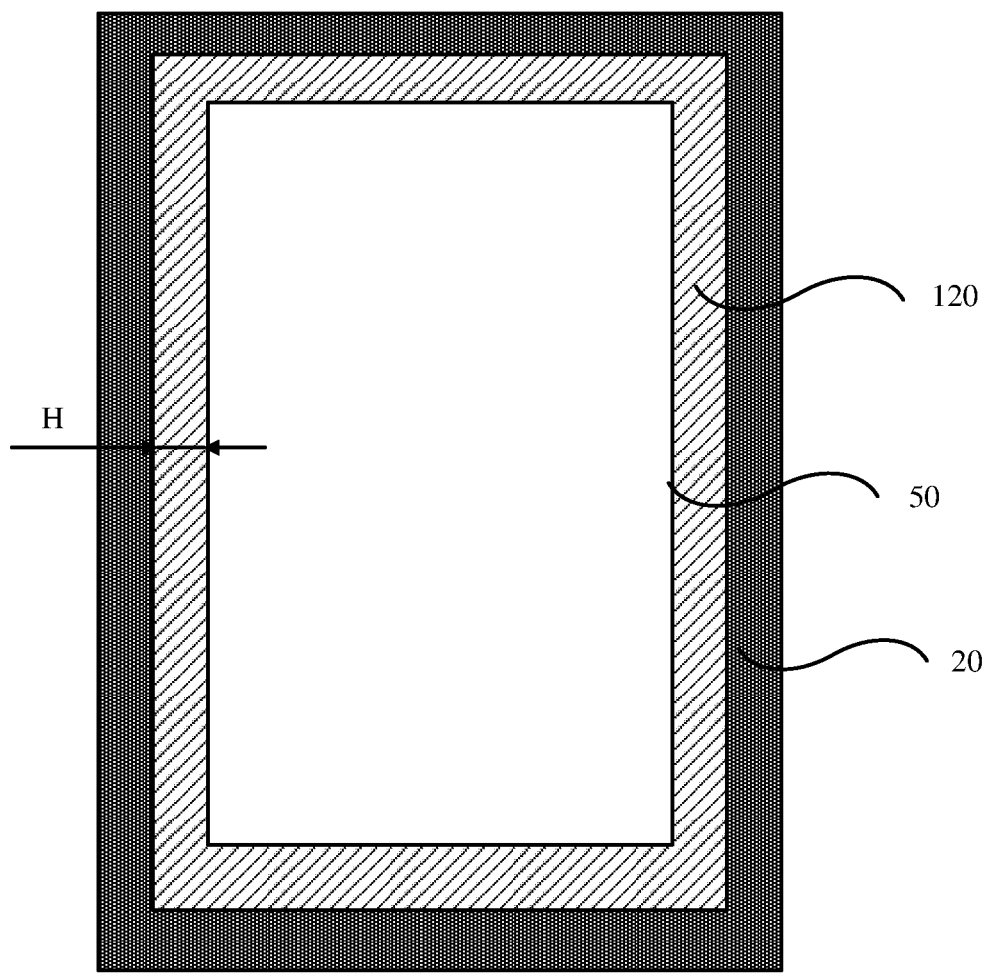
FIG. 7c is a schematic structural diagram of another electronic device according to an embodiment of this application.

A width of an unopened portion of the metal shield layer 120, that is, a width H of an annular portion of the metal shield layer 120 (as shown in FIG. 7b or FIG. 7c) may be in the range of $0\ mm < H \leq 2\ mm$. When the width H of the annular portion of the metal shield layer 120 is greater than 2 mm, benefit of the shielding effect of the metal shield layer 120 tends to be steady. Therefore, to save materials, the width H of the unopened portion of the metal shield layer 120 may be 0.5 mm, 1.5 mm, or 2 mm.

In this case, during fabrication of the shield structure 12, a metal thin film layer made from silver paste or copper foil may be formed on the first transparent carrier plate 121. Then, part of the material in the metal thin film layer is removed, for example, by etching, to form the hollow structure 50. Alternatively, in some other embodiments of this application, the annular metal shield layer 120 may be formed on the first transparent carrier plate 121 by using a three-dimensional (three dimensional, 3D) printing process. This application does not limit the fabrication method of the metal shield layer 120 having the hollow structure 50, and other fabrication methods are not described in detail herein.

Figure 8:
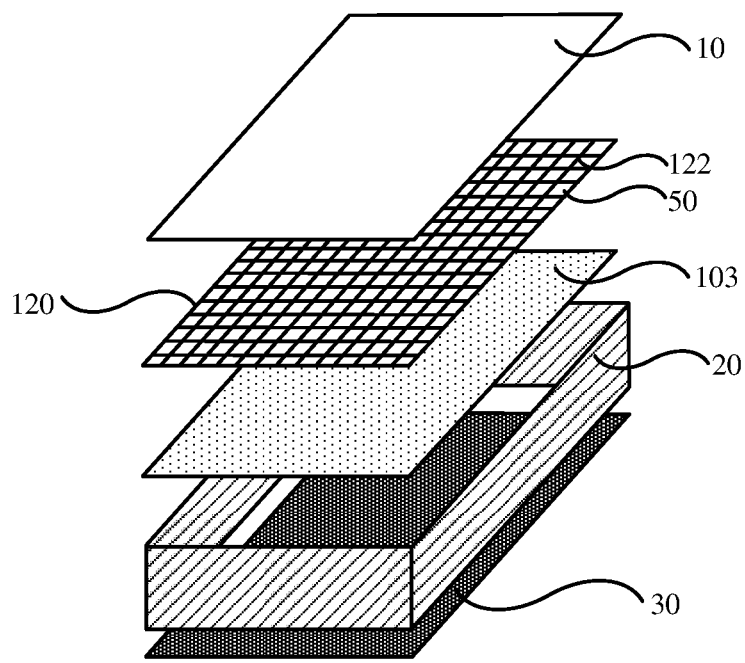
FIG. 8 is a schematic diagram of another arrangement of a shield structure according to an embodiment of this application.

In some other embodiments of this application, as shown in FIG. 8, the metal shield layer 120 may have a plurality of hollow structures 50. In this case, the metal shield layer 120 may include a plurality of intersecting metal wires 122. Each hollow structure 50 may be a gap defined by intersection of a plurality of adjacent metal wires 122. For example, the gap may be in a rectangular, triangular, polygonal, or irregular shape.

In this case, the metal shield layer 120 may be a metal mesh (metal mesh) structure formed by a plurality of the intersecting metal wires 122. The NFC 103 can transmit or receive a near field communication signal on a side of the display module through a gap defined by a plurality of adjacent metal wires 122 in the mesh-shaped metal shield layer 120, that is, the hollow structure 50. In some embodiments of this application, a metal mesh process may be used to prepare the metal wires 122 with a small wire width, for example, the metal wires 122 with a wire width of 0.1 μm to 20 μm. A distance between two adjacent metal wires 122 may range from 0.1 μm to 500 μm. In addition, the metal wire 122 has a sheet resistance R, where $0 < R \leq 10$ Ω/□.

In this way, because the wire width of the metal wire 122 is small, transmittance of the metal shield layer 120 can reach 85%. In addition, the metal mesh process (including the photolithography process) can control the sheet resistance of the metal wire 122 within 10Ω/□, such that the metal shield layer 120 can have a good electrical conductivity, helping enhance reflection of the radiated energy from the metal frame 20 by the metal shield layer 120, and improving the shielding effect.

Figure 9A:
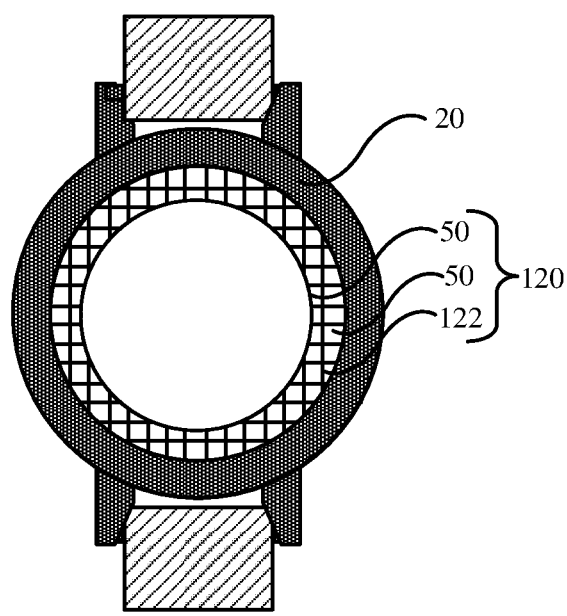
FIG. 9a a schematic structural diagram of another electronic device according to an embodiment of this application.
Figure 9B:
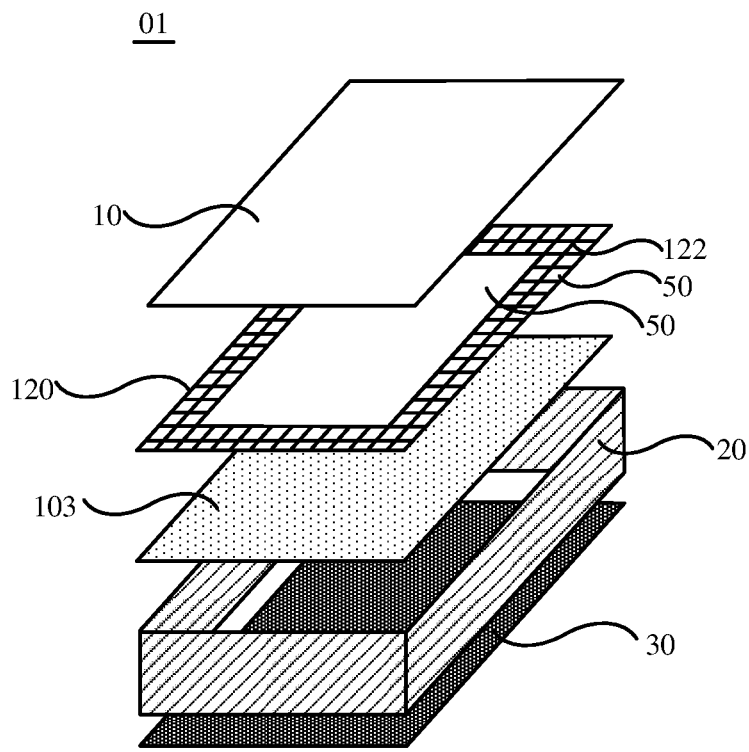
FIG. 9b is a schematic diagram of an arrangement of a shield structure according to an embodiment of this application.

In some other embodiments of this application, as shown in FIG. 9a, the metal shield layer 120 may have a plurality of hollow structures 50. One of the hollow structures 50 may be an opening provided in the metal shield layer 120, such that the metal shield layer 120 is annular. Taking the electronic device 01 as a watch for example, a shape of the opening matches the contour of the metal frame 20, and both are circular. Alternatively, as shown in FIG. 9b, taking the electronic device 01 as a mobile phone for example, a shape of the opening matches the contour of the metal frame 20, and both are rectangular.

In addition, a metal mesh structure is formed on the annular portion of the metal shield layer 120 by using the metal mesh process, and a gap defined by a plurality of adjacent metal wires 122 may be used as the hollow structure 50. In this way, the portion of the metal shield layer 120 that can shield near field communication signals of the NFC 103 is further reduced, thereby improving the efficiency of transmitting and receiving near field communication signals by the NFC 103.

Figure 10A:
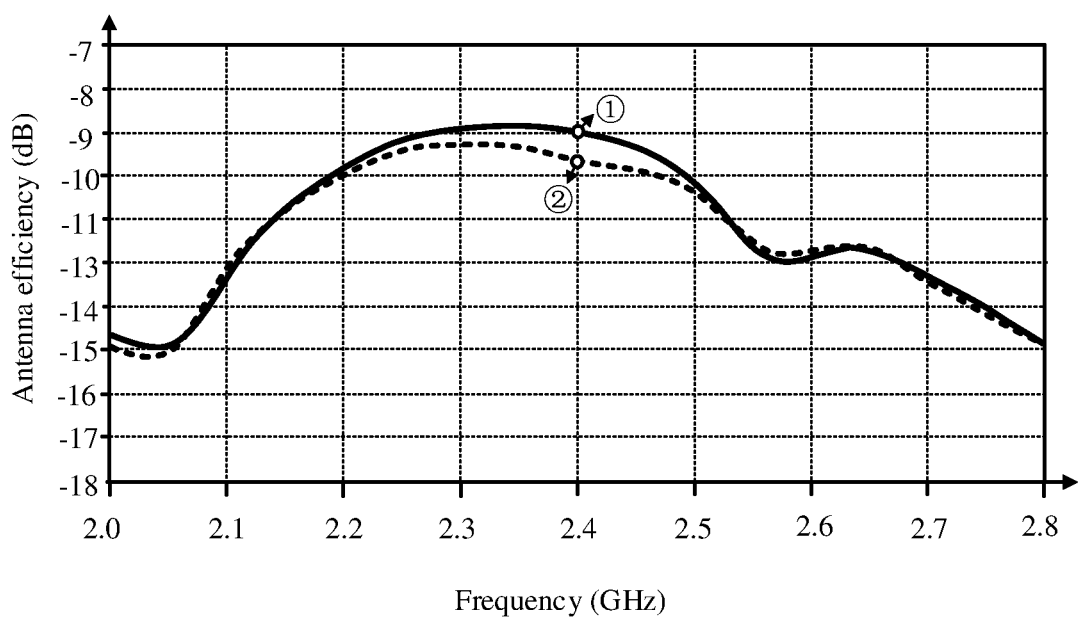
FIG. 10a is a line graph of antenna frequency and antenna energy absorbed by a lossy material according to an embodiment of this application.

In this case, when the electronic device 01 such as a watch adopts the structure of the metal shield layer 120 shown in FIG. 9a, the antenna efficiency of the metal frame 20 in radiating antenna signals is shown by curve ① in FIG. 10a. The antenna efficiency of a watch without the metal shield layer 120 is shown by curve ② in FIG. 10a. It can be seen that the antenna frequency in curve ① is improved compared to curve ②. For example, the antenna efficiency of the watch with a metal shield layer 120 near the 2.4 GHz Bluetooth band is significantly improved (by about 0.64 dB).

Figure 10B:
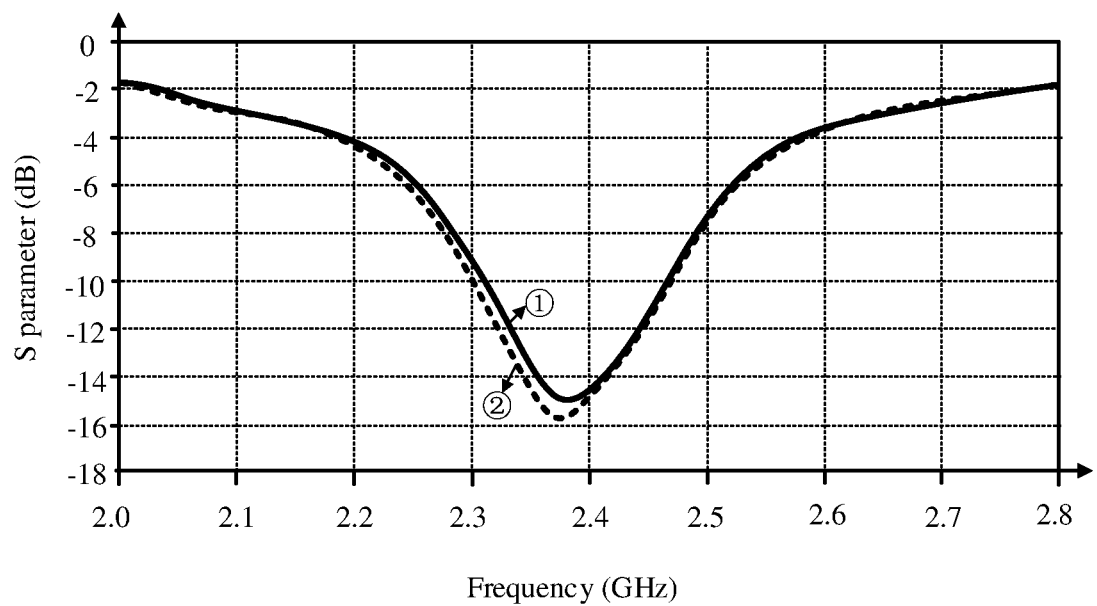
FIG. 10b is a line graph of antenna frequency and S parameter according to an embodiment of this application.

In addition, when the electronic device 01 such as a watch adopts the structure of the metal shield layer 120 shown in FIG. 9a, curve ① in FIG. 10b is an S11 curve illustrating the metal frame 20 radiating antenna signals. Curve ② in FIG. 10b is an S11 curve for a watch without the metal shield layer 120. It can be seen that compared to curve ②, in curve ①, magnitude of a reflection coefficient around the 2.4 GHz Bluetooth band shifts upward slightly.

To sum up, when the electronic device 01 such as a watch is provided with the metal shield layer 120, the metal frame 20 serves as an antenna, and the antenna efficiency is improved. The antenna efficiency and reflection coefficient are related to the absorption of the radiated energy from the metal frame 20 by the lossy material inside the display module 10. When the reflection coefficient is larger in a negative direction or the absorption of the radiated energy from the metal frame 20 by the lossy material inside the display module 10 is smaller, the antenna efficiency is higher. When the reflection coefficient is smaller in a negative direction or the absorption of the radiated energy from the metal frame 20 by the lossy material inside the display module 10 is larger, the antenna efficiency is lower. However, it can be seen from FIG. 10b that the reflection coefficient of a watch with the metal shield layer 120 (curve ①) does not change much compared to the reflection coefficient of a watch without the metal shield layer 120 (curve ②). Therefore, the improved antenna efficiency in the electronic device 01 provided in the embodiments of this application is mainly due to the reduced absorption of the radiated energy from the metal frame 20 by the lossy material inside the display module 10.

Figure 11:
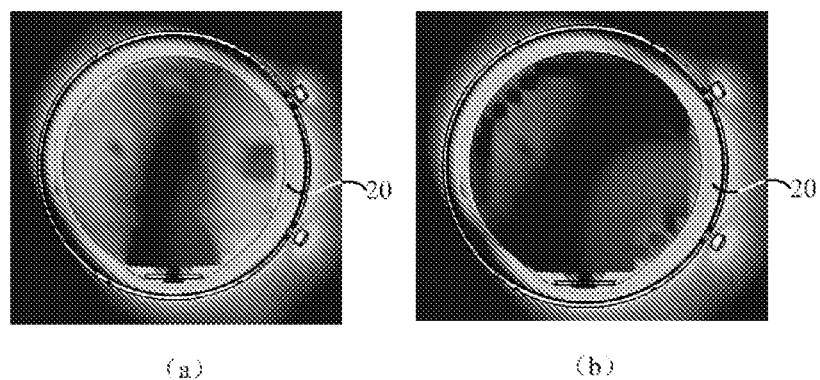
FIG. 11 is a schematic diagram of electric field distribution of an electronic device according to an embodiment of this application.

As described above, the metal shield layer 120 may generate reflection between the metal frame 20 and the display module 10, to weaken field strength generated in the display module 10 by the radiated energy from the metal frame 20. For example, the electric field distribution of the watch without the metal shield layer 120 is shown in FIG. 11(a), and the electric field distribution of the watch with the metal shield layer 120 is shown in FIG. 11(b). It can be seen that the field strength (white part) in the metal frame 20 in FIG. 11(b) is significantly weakened compared to that in FIG. 11(a).

Figure 12:
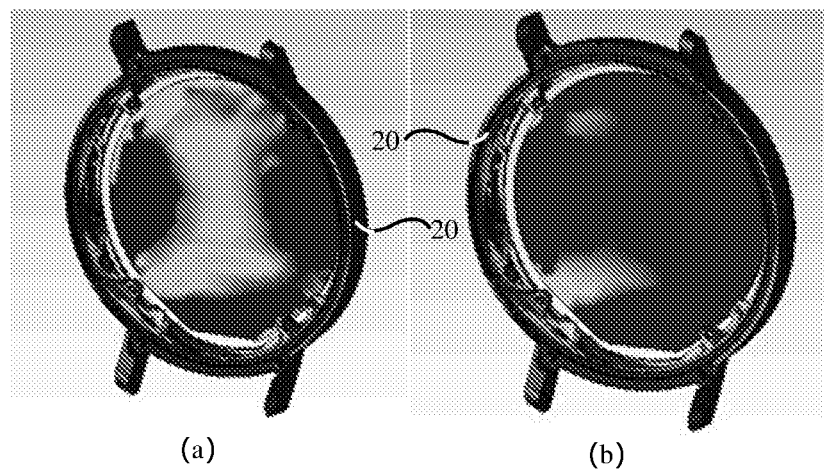
FIG. 12 is a schematic diagram of current distribution of an electronic device according to an embodiment of this application.

In addition, the current distribution of the watch without the metal shield layer 120 is shown in FIG. 12(a), and the current distribution of the watch with the metal shield layer 120 is shown in FIG. 12(b). It can be seen that the current (white part) in the metal frame 20 in FIG. 12(b) is significantly weakened compared to that in FIG. 12(a). Therefore, the metal shield layer 120 can shield the energy radiated from the metal frame 20 to the display module 10, and reduce absorption of the radiated energy from the metal frame 20 by the lossy material inside the display module 10, thereby improving the antenna efficiency.

Figure 13:
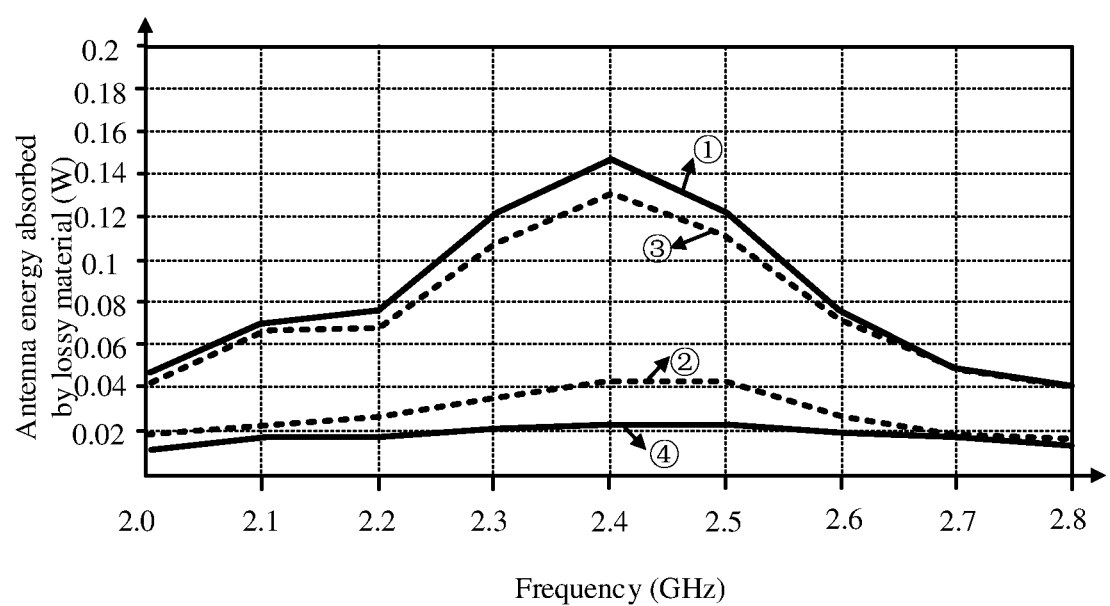
FIG. 13 is another line graph of antenna frequency and antenna energy absorbed by a lossy material according to an embodiment of this application.

In this case, as shown in FIG. 13 (a line chart of antenna energy absorbed by lossy material and operating frequency of the antenna), in a frequency range of 2 GHz to 2.8 GHz, a peak value of the radiated energy of the metal frame 20 absorbed by the metal materials (curve ①) in the display module 10 without the metal shield layer 120 can reach about 0.15 watts (W). However, a peak value of the radiated energy of the metal frame 20 absorbed by the metal materials (curve ③) in the display module 10 with the metal shield layer 120 is reduced to about 0.13 watts (W).

Moreover, a loss peak value of the radiated energy of the metal frame 20 absorbed by the transparent metal material (curve ②), such as ITO, in the display module 10 without the metal shield layer 120 can reach about 0.04 watts (W). However, a peak value of the radiated energy of the metal frame 20 absorbed by the transparent metal material (curve ④) in the display module 10 with the metal shield layer 120 is reduced to about 0.02 watts (W).

According to the foregoing description, the radiated energy of the metal frame 20 absorbed by the transparent metal material accounts for a large proportion of all radiated energy of the metal frame 20 absorbed by the metal materials. However, when the electronic device 01 is provided with the metal shield layer 120, the absorption of the radiated energy of the metal frame 20 by the transparent metal material can be greatly reduced, thereby effectively improving the antenna efficiency.

Example 2

As in Example 1, the shield structure 12 is disposed below the display module 10 (that is, on a side closer to the mainboard 30) in this example. In addition, the display module 10 may further include the NFC 103 shown in FIG. 14. The NFC 103 is disposed on the side of the display module 10 closer to the mainboard 30.

Different from Example 1, the NFC 103 is located between the shield structure 12 and the display module 10. Because the NFC 103 transmits or receives near field communication signals on a side of the display module, and the shield structure 12 is located on a side of the NFC 103 closer to the mainboard 30, the shield structure 12 does not affect the transmission and reception of near field communication signals by the NFC 103.

Figure 14:
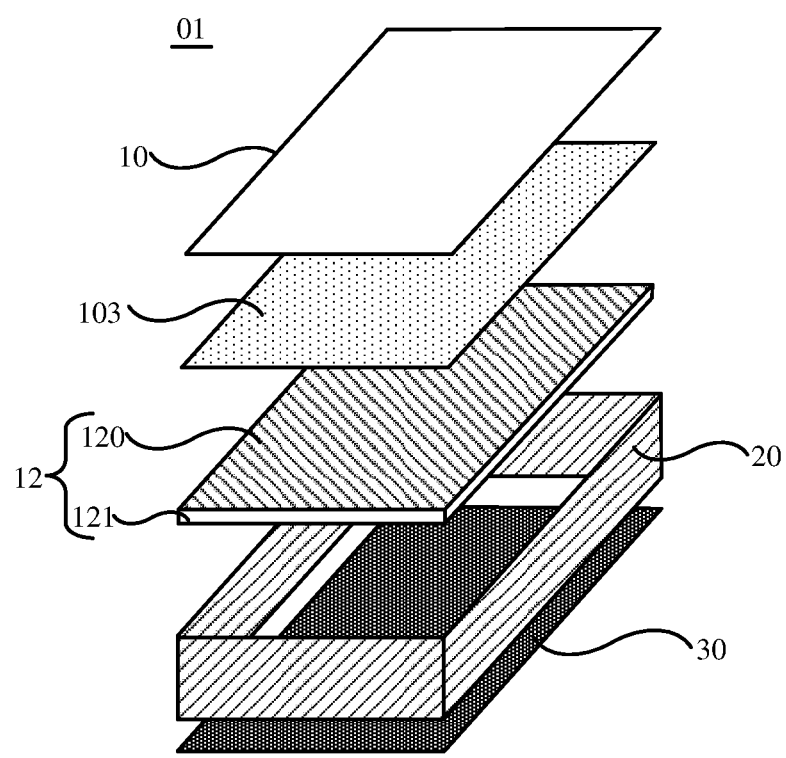
FIG. 14 is a schematic diagram of another arrangement of a shield structure according to an embodiment of this application.

In some embodiments of this application, as shown in FIG. 14, the metal shield layer 120 in the shield structure 12 may be an entire thin film layer disposed on the first transparent carrier plate 121. The metal shield layer 120 is located on a side surface of the first transparent carrier plate 121 closer to the NFC 103. The first transparent carrier plate 121 may be attached to a lower surface of the NFC 103 (a surface closer to the mainboard 30) by press-fitting. In this case, a vertical projection of the display module 10 on the mainboard 30 is within coverage of a vertical projection of the metal shield layer 120 on the mainboard 30.

Figure 15A:
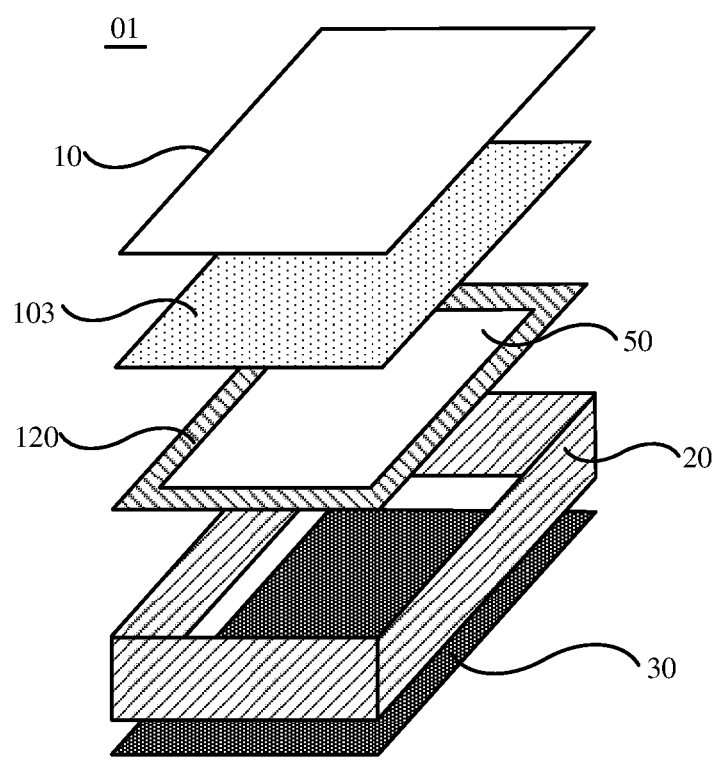
FIG. 15a is a schematic structural diagram of a shield structure according to an embodiment of this application.

Alternatively, in some other embodiments of this application, the metal shield layer 120 may be in an annular shape, such as a rectangular ring or a circular ring, as shown in FIG. 15a. The metal shield layer 120 is provided with an opening, and the opening serves as the hollow structure 50 of the metal shield layer 120. In this case, a width H of an unopened portion of the metal shield layer 120 may be in the range of 0 mm<H≤2 mm as described above.

Figure 15B:
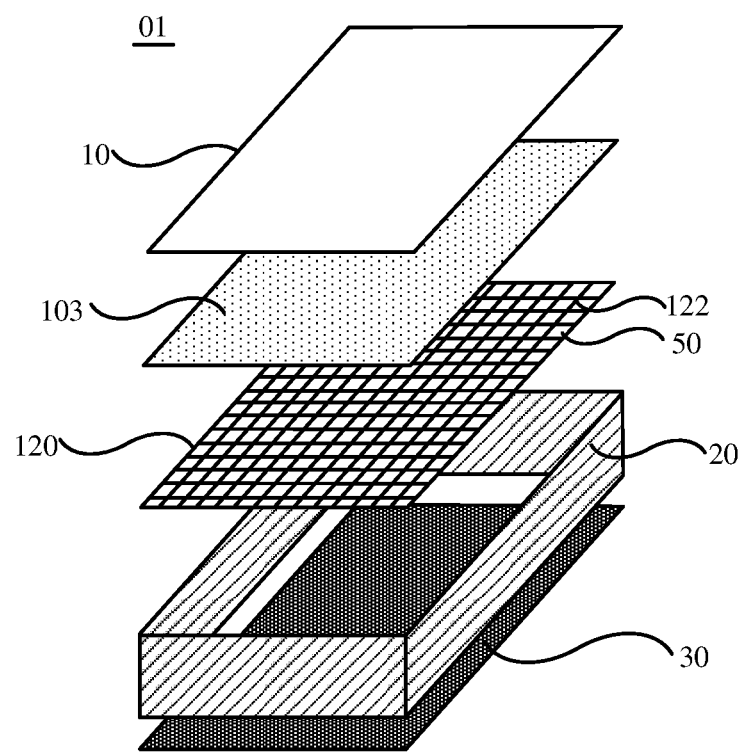
FIG. 15b is another schematic structural diagram of a shield structure according to an embodiment of this application.
Figure 15C:
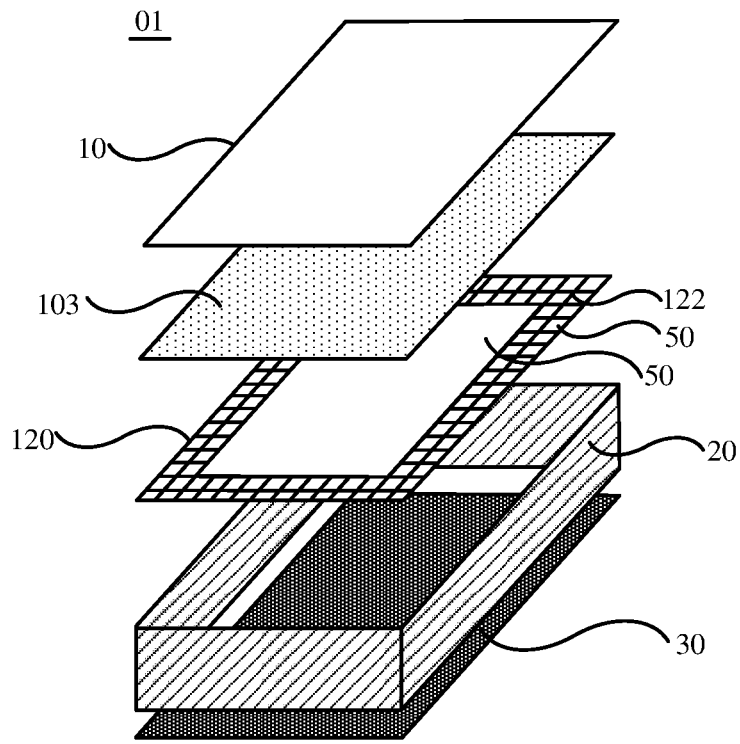
FIG. 15c is another schematic structural diagram of a shield structure according to an embodiment of this application.

Alternatively, in some other embodiments of this application, the metal shield layer 120 may be a metal mesh, as shown in FIG. 15b. Alternatively, the metal shield layer 120 may be a rectangular ring-shaped metal mesh with an opening in the center, as shown in FIG. 15c. In this case, the wire width of the metal wires 122 in the metal shield layer 120, the distance between two adjacent metal wires 122, and the sheet resistance R of the metal wires 122 are the same as those described above, and are not repeated herein.

It should be noted that, in Example 1 and Example 2, a type and structure of the display panel 101 in the display module 10 are not limited. For example, the display panel 101 may be an LCD display panel or an OLED display panel. Moreover, the display module 10 may be an on-cell touch display module or an in-cell touch display module.

Moreover, both Example 1 and Example 2 are based on an example in which the shield structure 12 is disposed below the display module 10 (that is, on a side closer to the mainboard 30). On this basis, when the display panel 101 is an LCD display panel, as described above, the array substrate 200 on the side closer to the mainboard 30 in the LCD display panel is provided with pixel electrodes 31 made of a transparent metal material, such as ITO, or provided with pixel electrodes 31 and a common electrode 32 (as shown in FIG. 4b). In this case, when the shield structure 12 is disposed below the display module 10, the metal shield layer 120 in the shield structure 12 is closer to the transparent metal material (that is, the pixel electrodes 31 and the common electrode 32) in the display panel 101, helping reduce the absorption of the radiated energy from the metal frame 20 by the transparent metal material, and improving the antenna efficiency.

In the following embodiments of this application, in a case that the display module 10 includes the display panel 101, the shield structure 12 may be disposed on a light-emitting side of the display panel 101 (that is, a side used for displaying images).

Example 3

In this example, the shield structure 12 may be disposed on the light-emitting side of the display panel 101. In this case, to prevent the shield structure 12 from affecting the displayed image of the display panel 101, the metal shield layer 120 of the shield structure 12 may be in a ring shape, and an opening in the middle of the ring is used to expose an active area (active area, AA) of the display panel 101; or the metal shield layer 120 may be the metal mesh structure with a transmittance of up to 85%.

Figure 16:
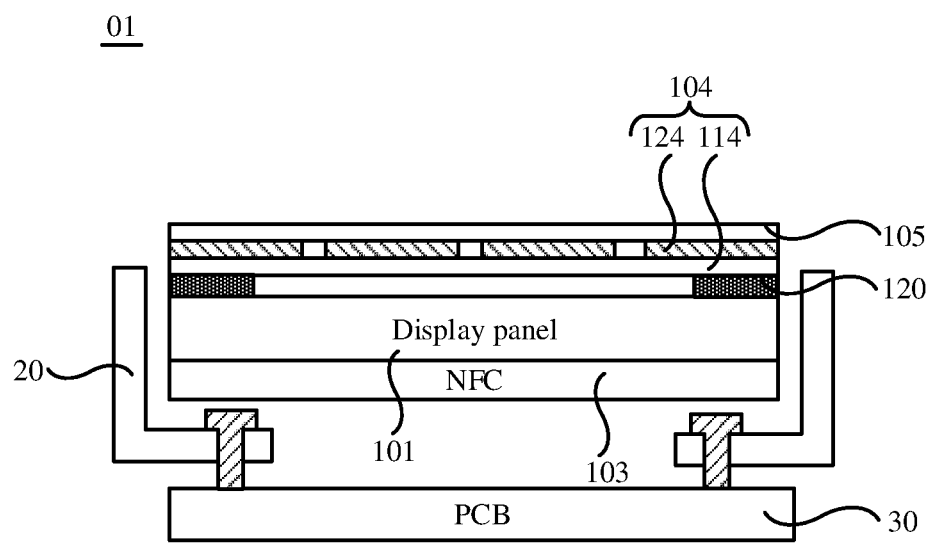
FIG. 16 is a schematic structural diagram of a cross-section of another electronic device according to an embodiment of this application.

In addition, the display module 10 may be an on-cell touch display module. In this case, the display module 10 further includes a touchscreen 104 disposed on the light-emitting side of the display panel 101, as shown in FIG. 16. The touchscreen 104 includes a second transparent carrier plate 114 and a plurality of insulating and transparent touch electrodes 124. The touch electrodes 124 are located on a side surface of the second transparent carrier plate 114 farther away from the display panel 101. The second transparent carrier plate 114 may be made of a transparent resin material or glass.

On this basis, the metal shield layer 120 in the shield structure 12 may be disposed between the touchscreen 104 and the display panel 101. The second transparent carrier plate 114 is connected to the display panel 101. In this case, the shield structure 12 may include only the metal shield layer 120. In the fabrication process, the metal shield layer 120 may be fabricated on a surface of the light-emitting side of the display panel 101. Alternatively, the metal shield layer 120 may be fabricated on a side surface of the second transparent carrier plate 114 closer to the display panel 101.

It should be noted that, in the embodiments of this application, when the display panel 101 is an LCD display panel, the surface of the light-emitting side of the display panel 101 refers to a side surface of the cell substrate 201 (as shown in FIG. 4a) in the display panel 101 farther away from the mainboard 30. Alternatively, when the display panel 101 is an OLED display panel, the surface of the light-emitting side of the display panel 101 refers to a side surface of a packaging cover plate 34 (as shown in FIG. 5) or a packaging film in the display panel 101 farther away from the mainboard 30.

On this basis, because the touch electrodes 124 are located on the side surface of the second transparent carrier plate 114 farther away from the display panel 101, to protect the touch electrodes 124, the display module 10 may further include a cover plate 105 covering the top of the touch electrodes 124. The cover plate 105 may be made of glass or sapphire.

Figure 17A:
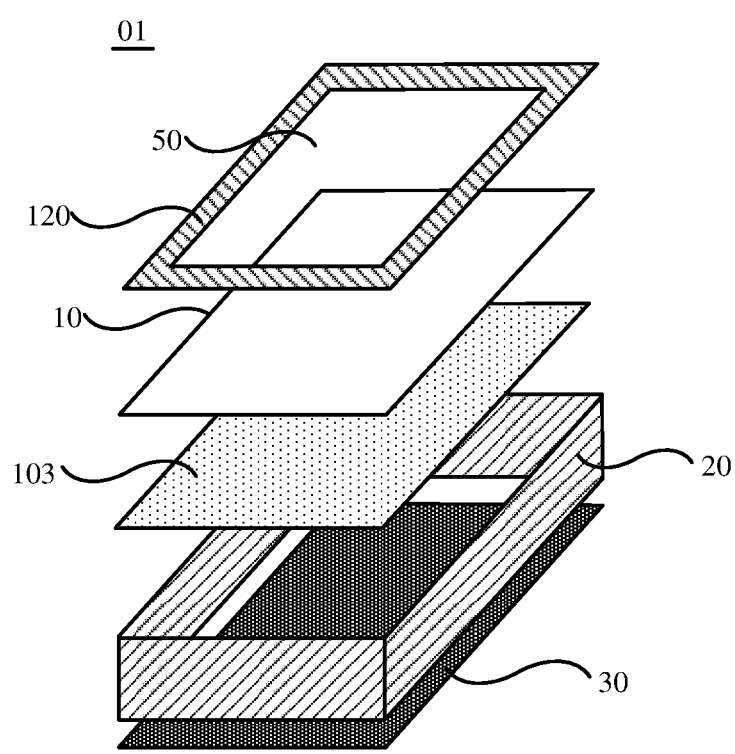
FIG. 17a is a schematic structural diagram of the shield structure in FIG. 16.

In addition, to prevent the metal shield layer 120 located on the light-emitting side of the display panel 101 from affecting the display effect, in some embodiments of this application, the metal shield layer 120 may be in a ring shape, such as a rectangular ring or circular ring shape, as shown in FIG. 17a. A relatively large opening is provided in a central position of the metal shield layer 120. The opening can expose the AA area of the display panel 101, and a region around the annular portion of the metal shield layer 120 only shields a driving circuit portion around the display panel 101.

Figure 17B:
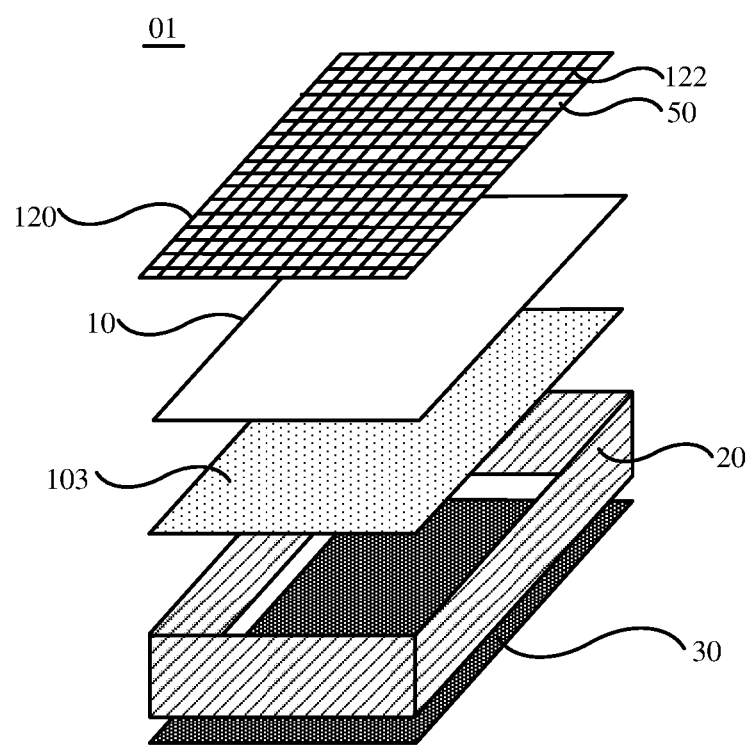
FIG. 17b is another schematic structural diagram of the shield structure in FIG. 16.
Figure 17C:
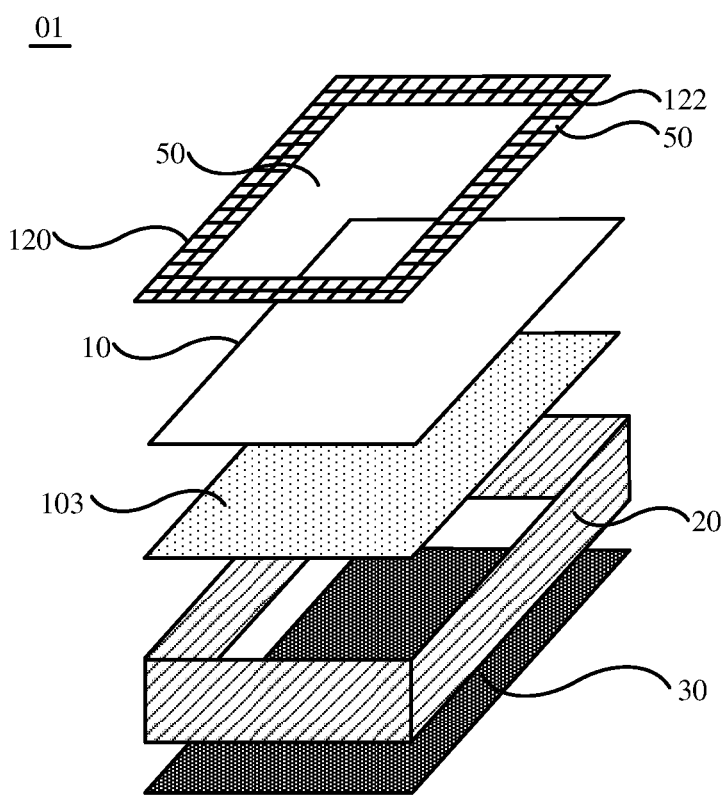
FIG. 17c is another schematic structural diagram of the shield structure in FIG. 16.

Alternatively, in some other embodiments of this application, the metal shield layer 120 may be a metal mesh, as shown in FIG. 17b. Alternatively, the metal shield layer 120 may be a rectangular ring-shaped metal mesh with an opening in the center, as shown in FIG. 17c. As described above, when the metal mesh is prepared by using the metal mesh process, a wire width of the metal wires 122 in the metal mesh ranges from 0.1 μm to 20 μm. A distance between two adjacent metal wires 122 may range from 0.1 μm to 500 μm. In this case, the metal wires 122 cannot be recognized by human eyes, such that the mesh-shaped metal shield layer 120 is in a transparent state for human eyes. In this case, transmittance of the metal shield layer 120 can reach 85%, so that the display effect of the display panel 101 is not greatly affected.

Example 4

Like Example 3, in this example, the shield structure 12 is disposed on the light-emitting side of the display panel 101, the metal shield layer 120 of the shield structure 12 may be in a ring shape, and an opening in the middle of the ring is used to expose an AA area of the display panel 101; or the metal shield layer 120 may be the metal mesh structure with a transmittance of up to 85%. In addition, the display module 10 is an on-cell touch display module.

Figure 18:
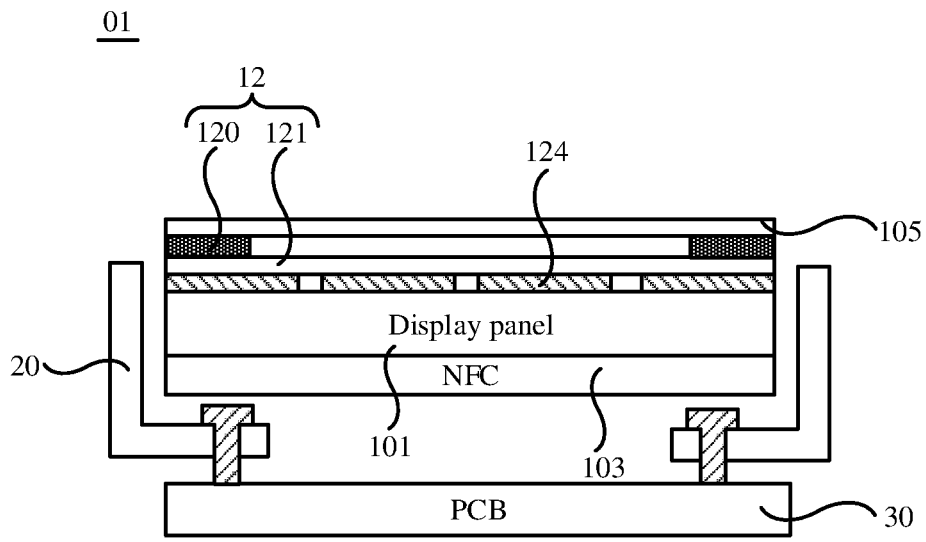
FIG. 18 is a schematic structural diagram of a cross-section of another electronic device according to an embodiment of this application.

Different from that in Example 3, the display module 10 further includes a plurality of insulating and transparent touch electrodes 124, as shown in FIG. 18. The touch electrodes 124 are disposed on a side surface of the display panel 101 farther away from the mainboard 30.

In this case, the shield structure 12 may include a metal shield layer 120 and a first transparent carrier plate 121. The metal shield layer 120 is disposed on a side surface of the first transparent carrier plate 121 farther away from the display panel 101. The first transparent carrier plate 121 may be attached to a surface of the light-emitting side of the display panel 101 by press-fitting. In addition, to protect the metal shield layer 120, the display module 10 may further include a cover plate 105 covering the top of the touch electrodes 124. The arrangement of the metal shield layer 120 and the cover plate 105 is the same as that in Example 3, and is not repeated herein.

To sum up, Example 3 and Example 4 are both based on an example that the display module 10 is an on-cell touch display module. The metal shield layer 120 is disposed closer to the touch electrodes 124. As described above, the touch electrodes 124 may be made of a transparent metal material, such as ITO. Therefore, when the metal shield layer 120 is disposed closer to the touch electrodes 124, the metal shield layer 120 helps reduce the absorption of the radiated energy from the metal frame 20 by the transparent metal material, thereby improving the antenna efficiency.

In addition, in Example 3 and Example 4, a type and structure of the display panel 101 in the display module 10 are not limited. For example, the display panel 101 may be an LCD display panel or an OLED display panel. As described above, when the display panel 101 is an OLED display panel, among a plurality of OLED devices, a first electrode 331 made of a transparent metal material is located above (that is, closer to the light-emitting side of the display panel), as shown in FIG. 5. Therefore, when the shield structure 12 is disposed on the light-emitting side of the display panel 101, for example, between the touch electrodes 124 and the display panel 101 (Example 3), or above the touch electrodes 124 (Example 4), the metal shield layer 120 in the shield structure 12 can be closer to the transparent metal material (that is, the touch electrodes 124 and the first electrode 331) in the display module 10. This helps reduce the absorption of the radiated energy from the metal frame 20 by the transparent metal material, thereby improving the antenna efficiency.

In the following embodiments of this application, the display module 10 is an in-cell touch display module.

Example 5

In this example, the shield structure 12 may be disposed on the light-emitting side of the display panel 101, the metal shield layer 120 of the shield structure 12 may be in a ring shape, and an opening in the middle of the ring is used to expose an AA area of the display panel 101; or the metal shield layer 120 may be the metal mesh structure with a transmittance of up to 85%. In addition, the display module 10 may be an in-cell touch display module.

Figure 19:
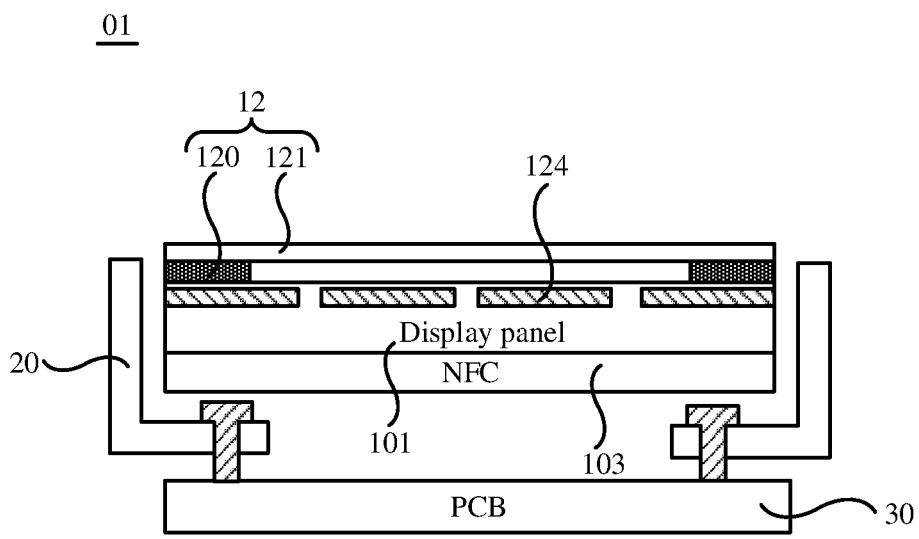
FIG. 19 is a schematic structural diagram of a cross-section of another electronic device according to an embodiment of this application.

In this case, the display panel 101 may include a plurality of insulating and transparent touch electrodes 124, as shown in FIG. 19. The shield structure 12 may include a metal shield layer 120 and a first transparent carrier plate 121. The metal shield layer 120 is disposed on a side surface of the first transparent carrier plate 121 closer to the display panel 101. The first transparent carrier plate 121 may be attached to the display panel 101 by press-fitting. The arrangement of the metal shield layer 120 is the same as that in Example 3, and is not repeated herein. In this case, the first transparent carrier plate 121 may serve as a cover plate of the electronic device 01 for receiving finger touches.

It should be noted that the display panel 101 may include a plurality of insulating and transparent touch electrodes 124, which means that the touch electrodes 124 are integrated in the display panel 101. For example, when the display panel 101 is an LCD display panel, and the common electrodes 32 (as shown in FIG. 4b) in the display panel 101 are fabricated on the cell substrate 201 (as shown in FIG. 4a), the plurality of common electrodes 32 may be made into a plurality of block electrodes that are spaced apart. In this case, all the block electrodes serve as the touch electrodes 124 during touch control. During display, the plurality of block electrodes receive the same voltage and are reused as the common electrodes 32. Alternatively, for example, when the display panel 101 is an OLED display panel, the first electrode 331 among the OLED devices may be reused as a touch electrode during touch control.

The foregoing describes the arrangement of the shield structure 12 by using an example in which the display module 10 includes the touch electrodes 124. Moreover, when the display module 10 does not have the touch function, the metal shield layer 120 in the shield structure 12 may be directly disposed on the surface of the light-emitting side of the display panel 101.

Moreover, the foregoing descriptions are all based on an example that the metal shield layer 120 is suspended in the metal frame 20. In some other embodiments of this application, the metal shield layer 120 may alternatively be coupled to a ground terminal on the mainboard 30, to achieve the shielding effect.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising:
   a display module, configured to display an image;
   a mainboard, comprising a radio frequency circuit;
   a metal frame surrounding the display module, coupled to the radio frequency circuit and configured to receive or transmit a radio frequency signal;
   a shield structure, located in the display module or on a side of the display module closer to the mainboard, and connected to the display module, wherein the shield structure comprises a metal shield layer, the metal shield layer is insulated from the metal frame and the radio frequency circuit, and the metal shield layer is annular; and
   a near field communication circuit, wherein the near field communication circuit and the shield structure are both disposed on the side of the display module closer to the mainboard; and
   the shield structure is located between the near field communication circuit and the display module; and the near field communication circuit is configured to transmit or receive a near field communication signal on a side of the display module through an opened portion in the metal shield layer.

2. The electronic device according to claim 1, wherein the metal shield layer comprises a mesh structure formed by a plurality of intersecting metal wires.

3. The electronic device according to claim 2, wherein a wire width of the metal wire ranges from 0.1 µm to 20 µm; a distance between two adjacent metal wires ranges from 0.1 µm to 500 µm; the metal wire has a sheet resistance R; and $0 < R \leq 10 \ \Omega/\square$.

4. The electronic device according to claim 1, wherein a width H of an annular portion of the metal shield layer is in the range of $0 \ mm < H \leq 2 \ mm$.

5. The electronic device according to claim 1, wherein the metal frame, the metal shield layer, and the display module are all in a circular ring shape; and centers of the metal frame, the metal shield layer, and the display module coincide; or the metal frame, the metal shield layer, and the display module are all in a rectangular ring shape; geometric centers of the metal frame, the metal shield layer, and the display module coincide; and the geometric center is an intersection of two diagonal lines of the rectangular ring.

6. The electronic device according to claim 1, wherein the display module comprises a display panel; the shield structure is disposed on a light-emitting side of the display panel; and an opened portion of the metal shield layer is used to expose an active area of the display panel.

7. The electronic device according to claim 1, wherein the shield structure further comprises a transparent carrier plate; and the metal shield layer is disposed on a side surface of the transparent carrier plate closer to the display module; and
   the transparent carrier plate is connected to the display module; and a thickness of the transparent carrier plate ranges from 23 µm to 150 µm.

8. The electronic device according to claim 1, wherein the metal shield layer comprises at least one of silver or copper.

9. The electronic device according to claim 1, wherein the metal shield layer is coupled to a ground terminal on the mainboard.

10. The electronic device according to claim 1, wherein the shield structure is configured to shield energy radiated from the metal frame to the display module.

11. The electronic device according to claim 1, wherein the shield structure is disposed in the metal frame and surrounded by the metal frame.

\* \* \* \* \*

UNITED STATES PATENT AND TRADEMARK OFFICE
CERTIFICATE OF CORRECTION

PATENT NO. : 11,848,494 B2
APPLICATION NO. : 17/791054
DATED : December 19, 2023
INVENTOR(S) : Rong Wang et al.

It is certified that error appears in the above-identified patent and that said Letters Patent is hereby corrected as shown below:

On the Title Page

Change item "(71) Applicant: HONOR DEVICE CO., LTD., Guangdong (CN)", to "(71) Applicant: HONOR DEVICE CO., LTD., Shenzhen (CN)".

Signed and Sealed this
Twenty-sixth Day of March, 2024

Katherine Kelly Vidal
*Director of the United States Patent and Trademark Office*